United States Patent [19]
Mihara et al.

[11] Patent Number: 5,570,233
[45] Date of Patent: Oct. 29, 1996

[54] VARI-FOCAL LENS SYSTEM

[75] Inventors: Shinichi Mihara; Hironori Shibata, both of Tokyo, Japan

[73] Assignee: Olympus Optical Co., Ltd., Tokyo, Japan

[21] Appl. No.: 269,790

[22] Filed: Jul. 1, 1994

[30] Foreign Application Priority Data

Jul. 5, 1993 [JP] Japan ................................. 5-190957

[51] Int. Cl.⁶ .................................................. G02B 15/14
[52] U.S. Cl. ........................... 359/687; 359/684; 359/686
[58] Field of Search .................................. 359/687, 684, 359/695, 715, 740, 685, 683

[56] References Cited

U.S. PATENT DOCUMENTS

| | | | |
|---|---|---|---|
| 5,032,013 | 7/1991 | Shibayama | 359/684 |
| 5,134,524 | 7/1992 | Hamano | 359/687 |
| 5,189,558 | 2/1993 | Ishii et al. | 359/687 |
| 5,191,476 | 3/1993 | Sato | 359/687 |

FOREIGN PATENT DOCUMENTS

| | | | |
|---|---|---|---|
| 401862 | 12/1990 | European Pat. Off. | 359/684 |
| 12619 | 1/1991 | Japan | 359/684 |
| 12620 | 1/1991 | Japan | 359/684 |
| 560973 | 3/1993 | Japan . | |
| 405188295 | 7/1993 | Japan | 359/687 |

*Primary Examiner*—Georgia Y. Epps
*Assistant Examiner*—Ricky Mack
*Attorney, Agent, or Firm*—Cushman, Darby & Cushman

[57] ABSTRACT

A vari-focal lens system comprising, in order from the object side, a first lens unit having a positive refractive power, a second lens unit having a negative refractive power, a third lens unit having a positive refractive power and a fourth lens unit having a positive refractive power; and configured so as to be set at a focal length at a telephoto position thereof from that at a wide-angle position thereof by moving the first lens unit monotonically toward the object side, displacing the second lens unit monotonically toward the image side, setting the third lens unit at a location on the object side of its original setting at the wide-angle position and moving the fourth lens unit from a location thereof to focus the vari-focal lens system on an object effectively located at infinite distance so as to widen an airspace reserved between the third lens unit and the fourth lens unit as compared to the airspace at the wide-angle position. The vari-focal lens system can be focused by moving the fourth lens unit.

28 Claims, 16 Drawing Sheets

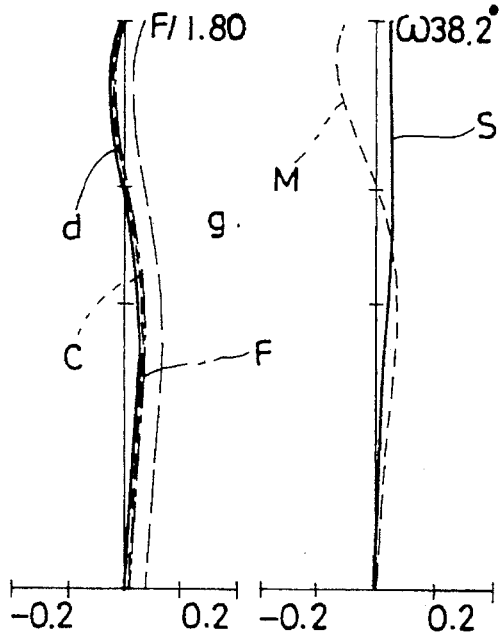
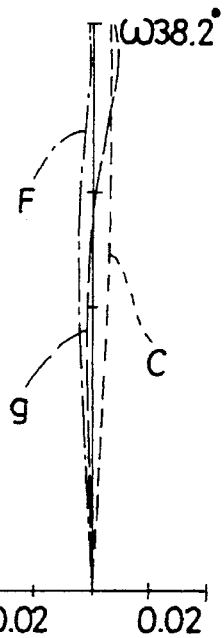
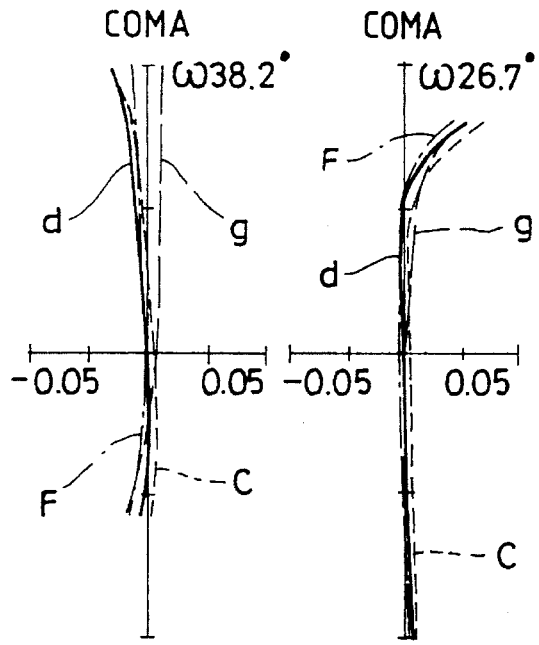
FIG. 5A SPHERICAL ABERRATION
FIG. 5B ASTIGMATISM
FIG. 5C DISTORTION
FIG. 5D LATERAL CHROMATIC ABERRATION
FIG. 5E COMA
FIG. 5F COMA

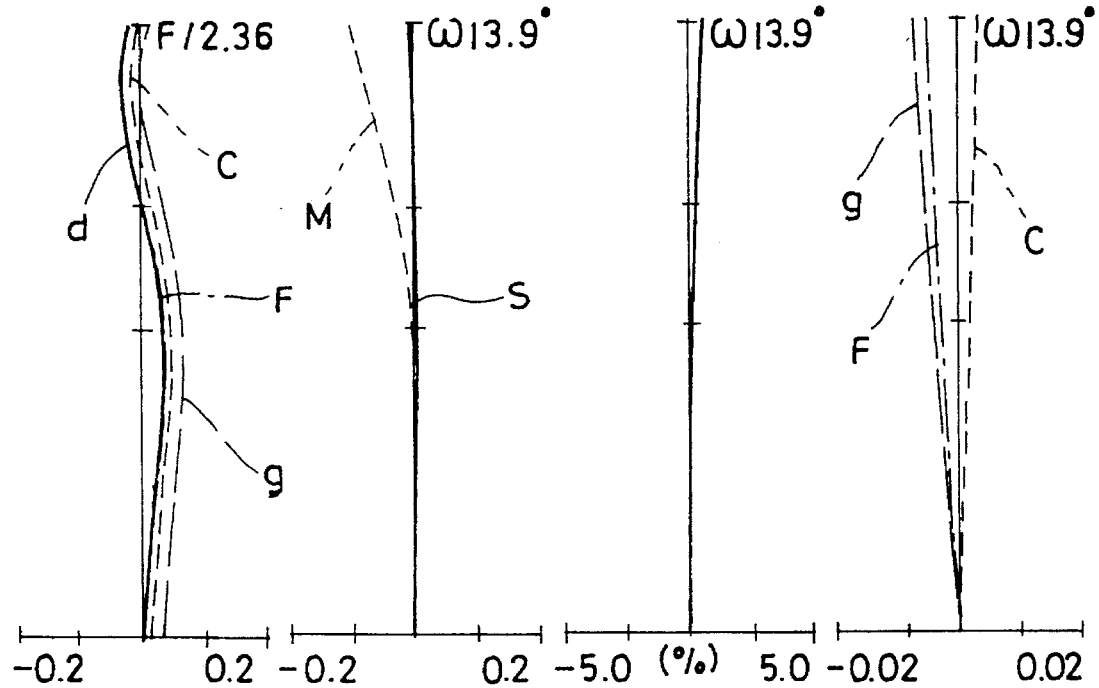
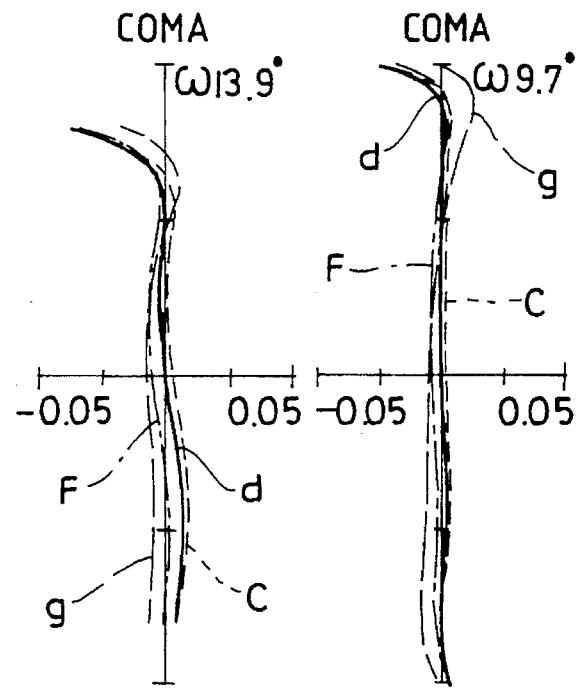

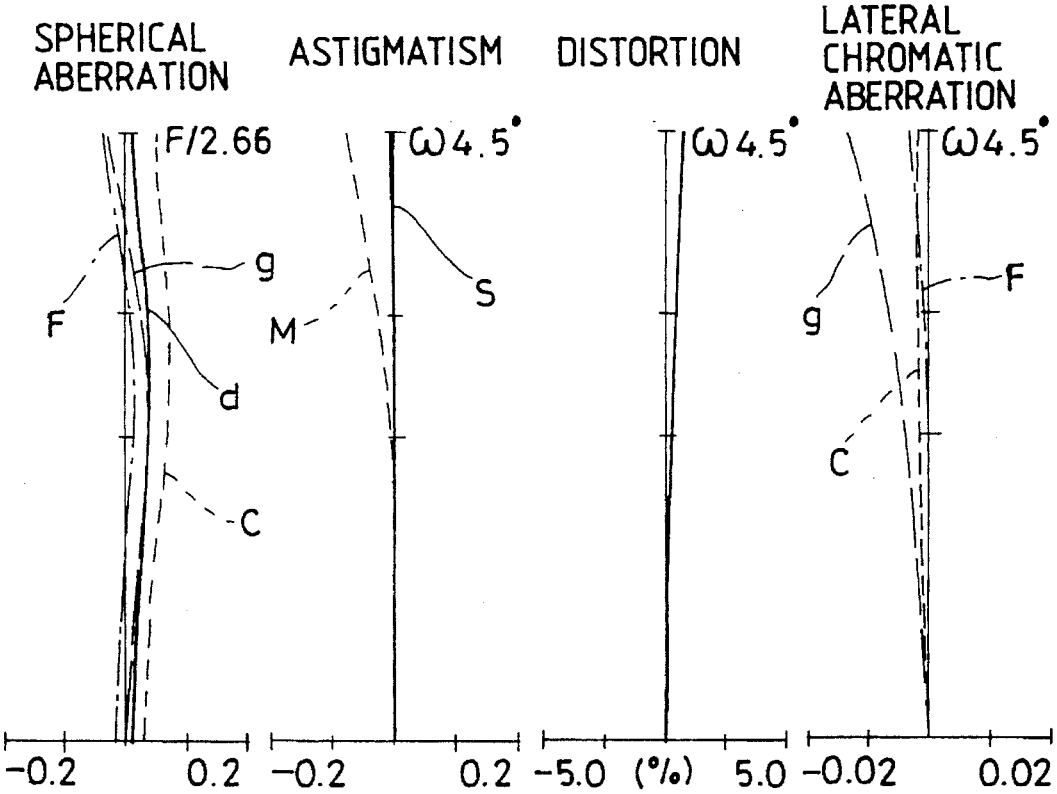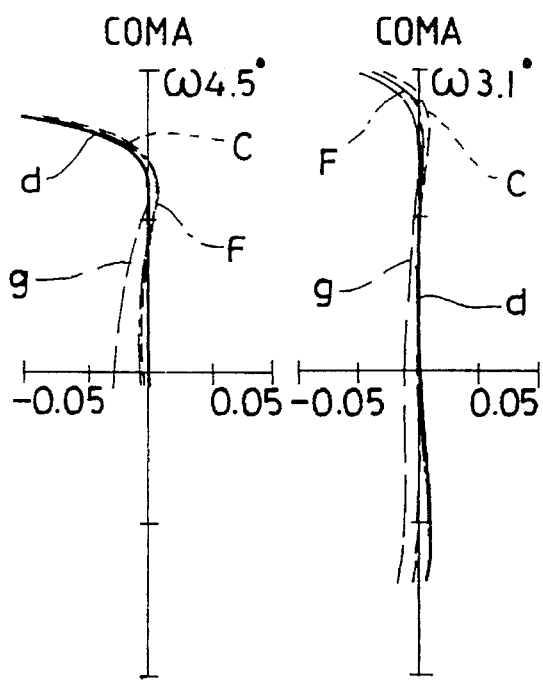

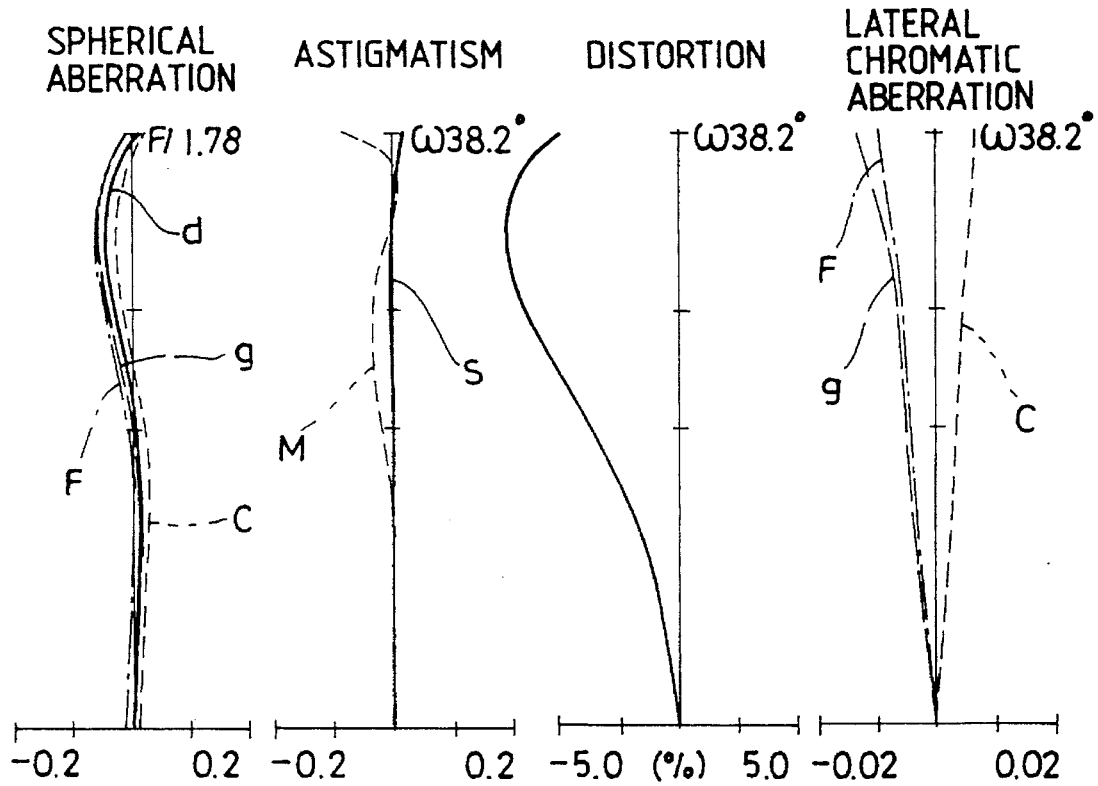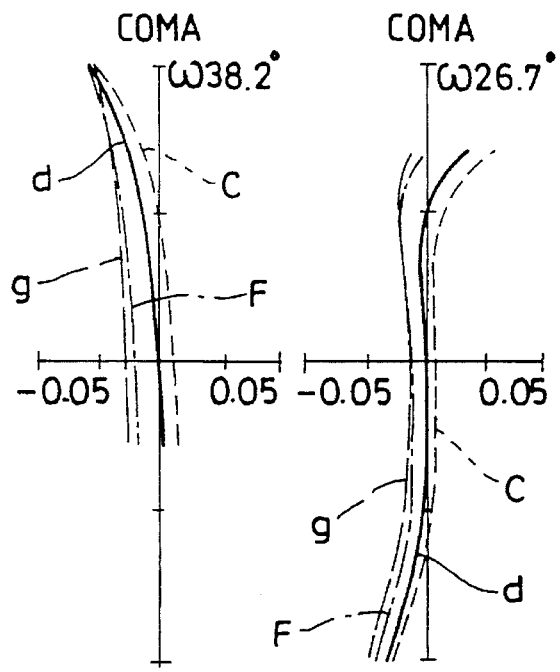

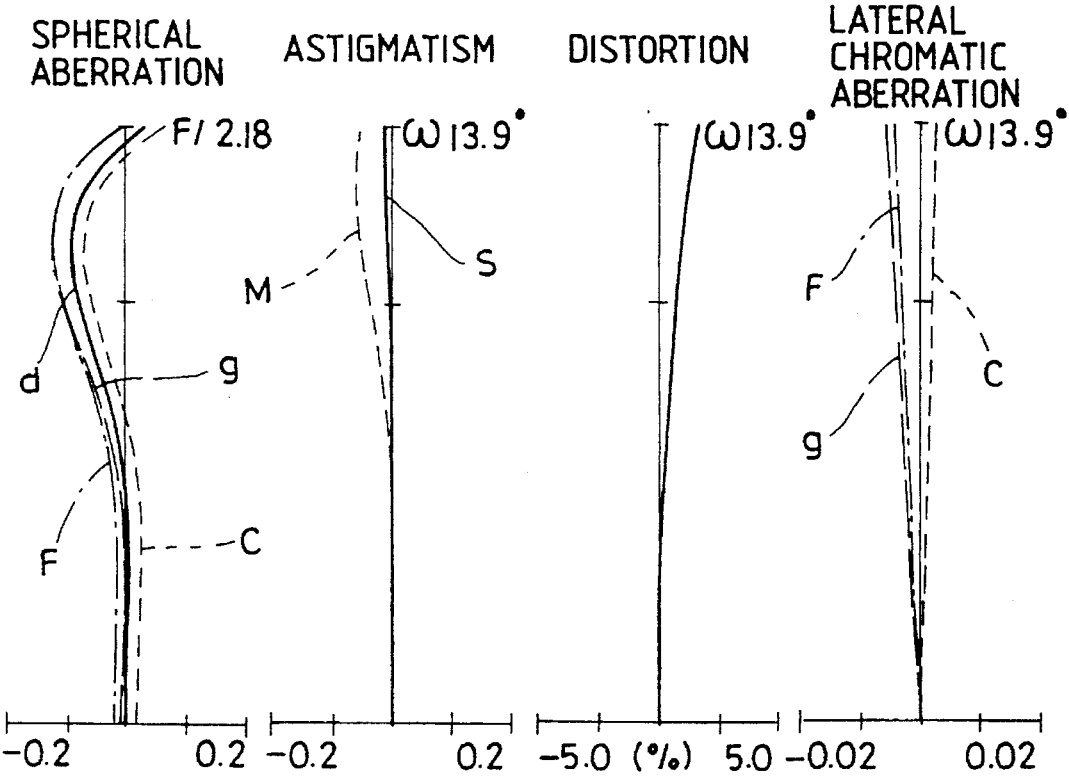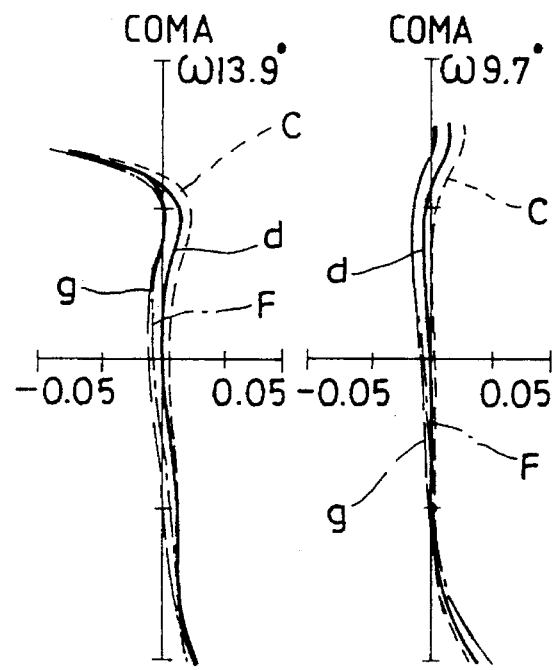

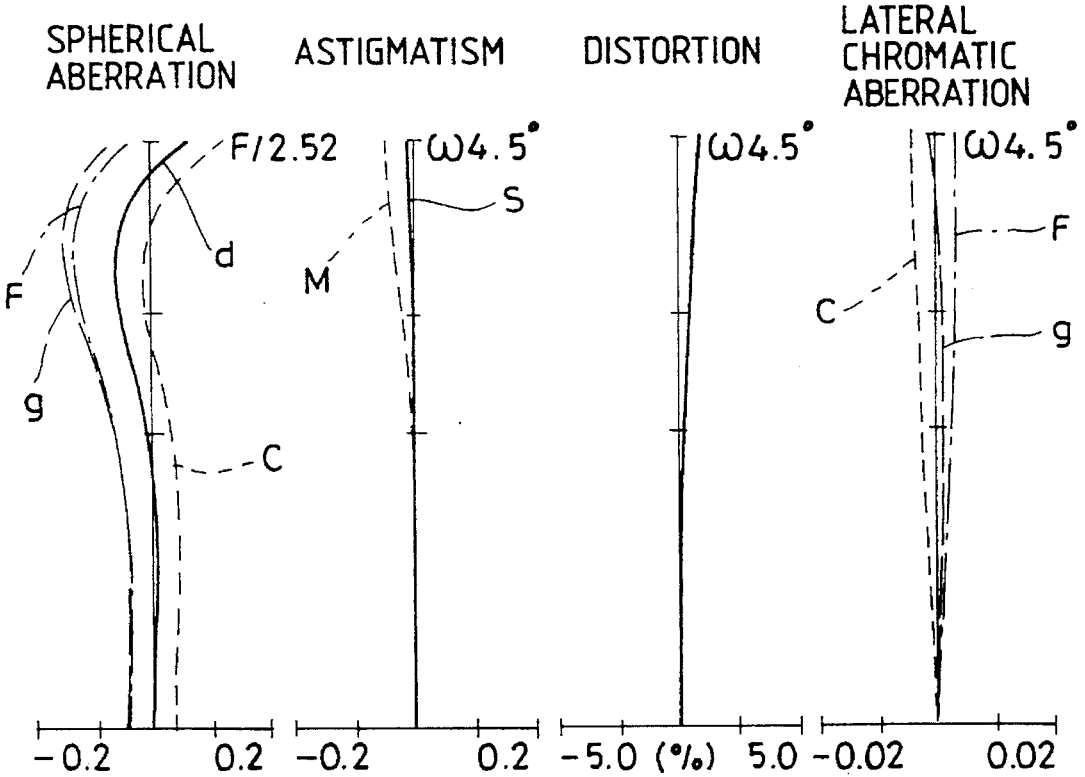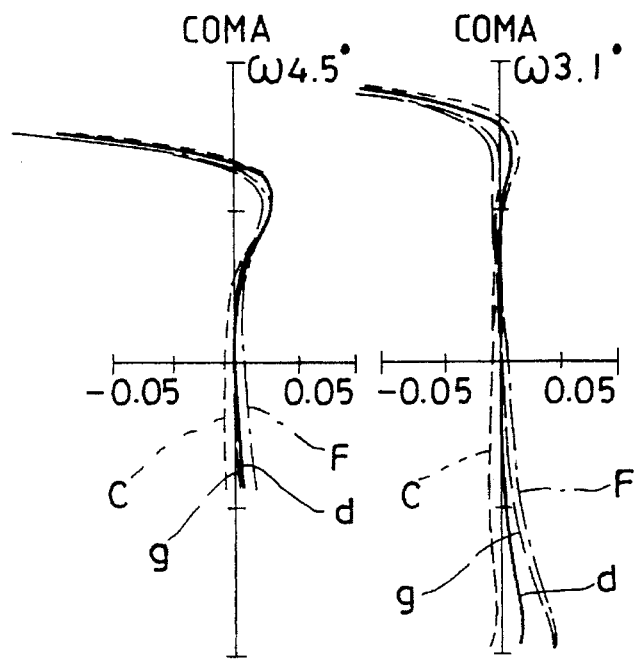

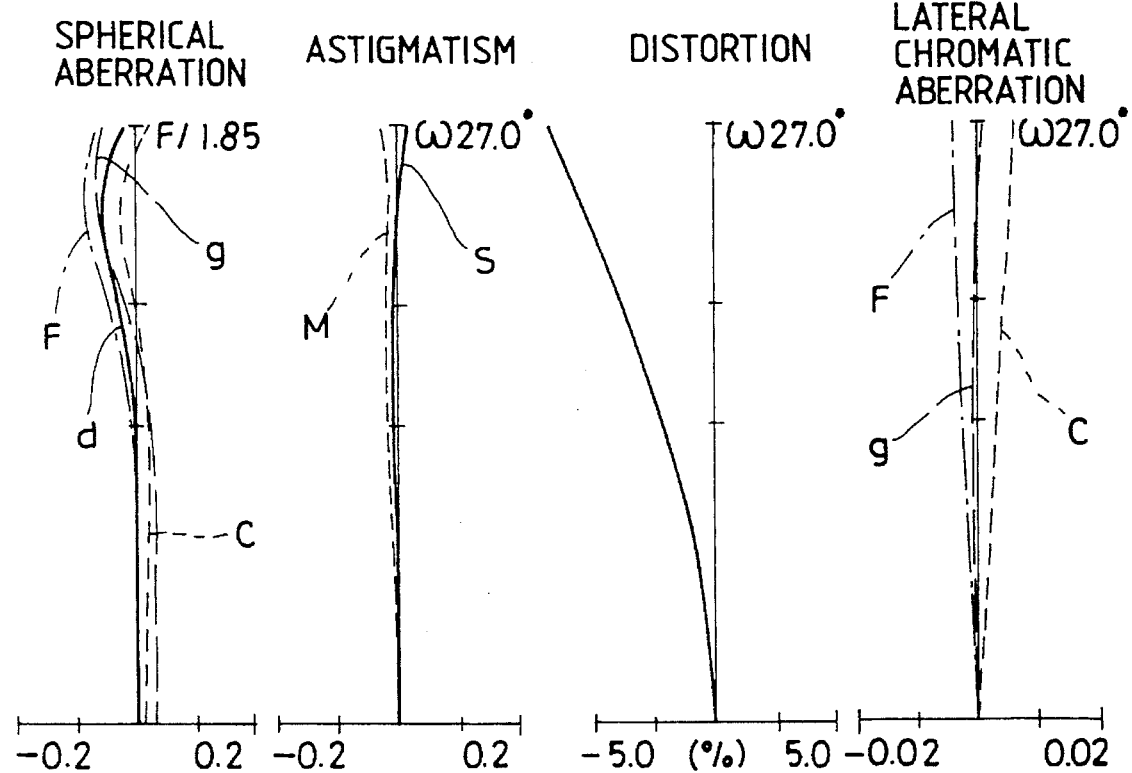
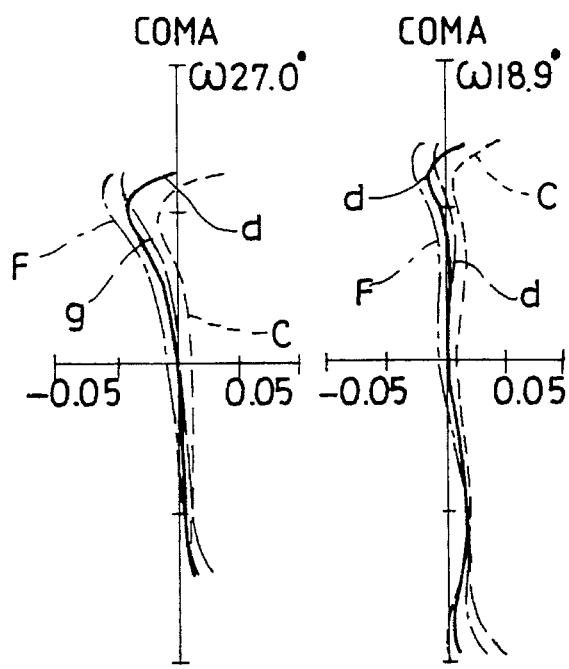

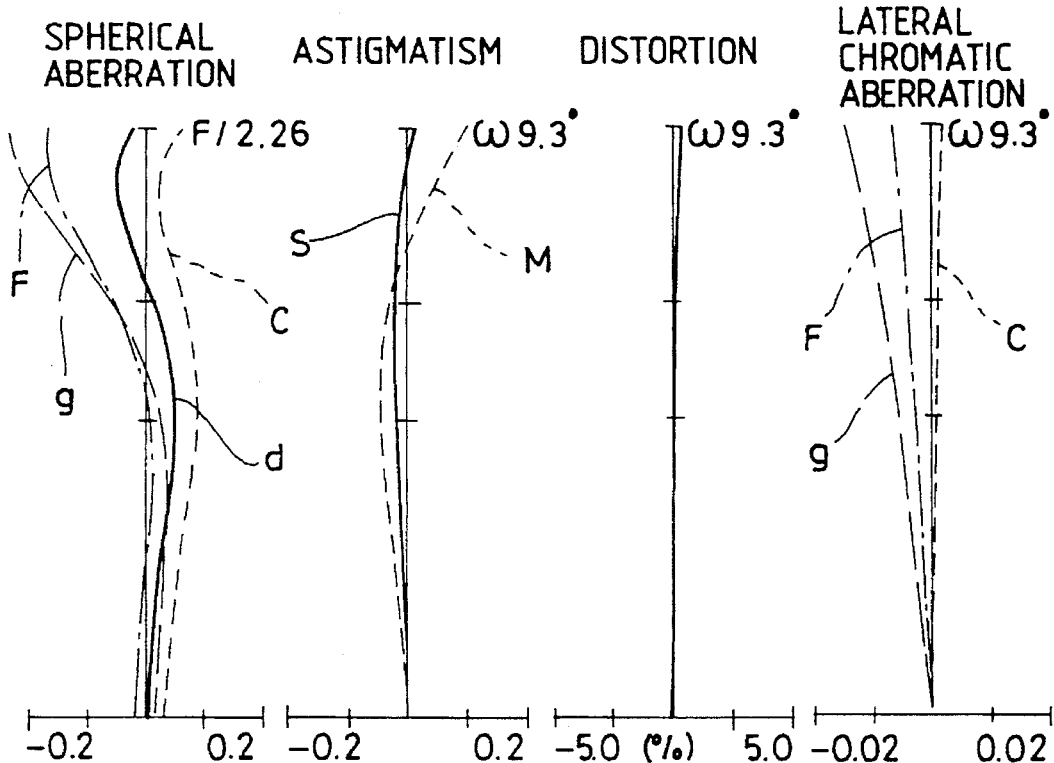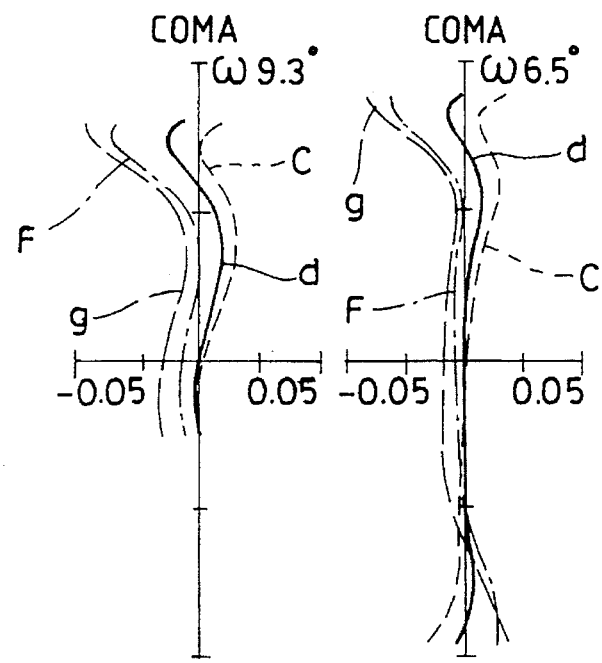

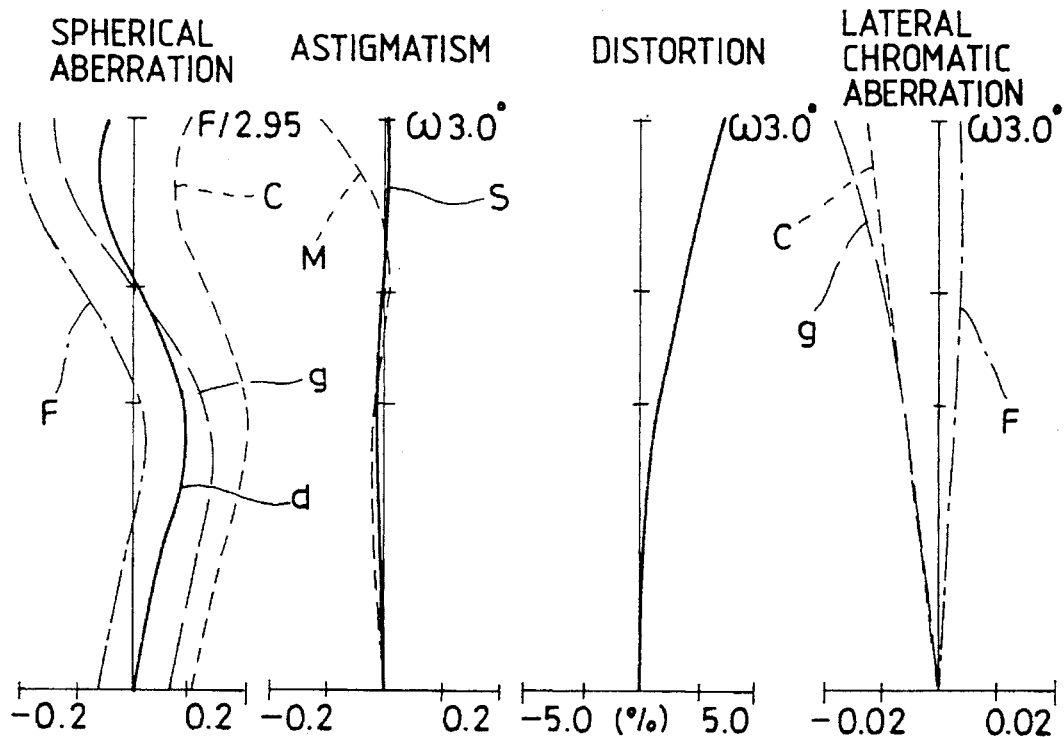
FIG. 13A SPHERICAL ABERRATION
FIG. 13B ASTIGMATISM
FIG. 13C DISTORTION
FIG. 13D LATERAL CHROMATIC ABERRATION
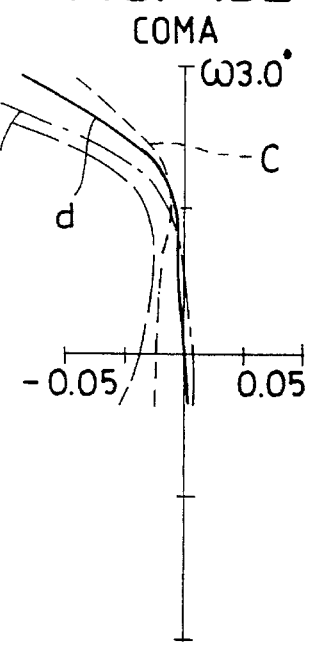
FIG. 13E COMA
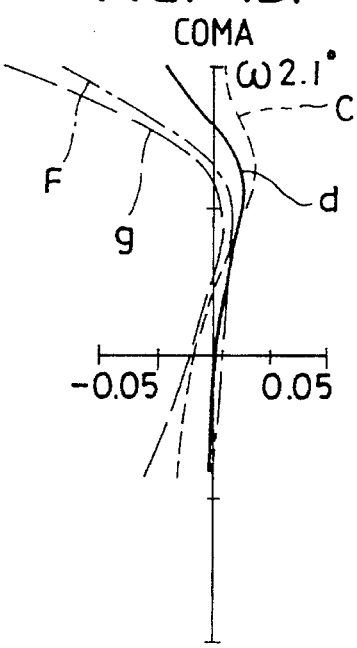
FIG. 13F COMA

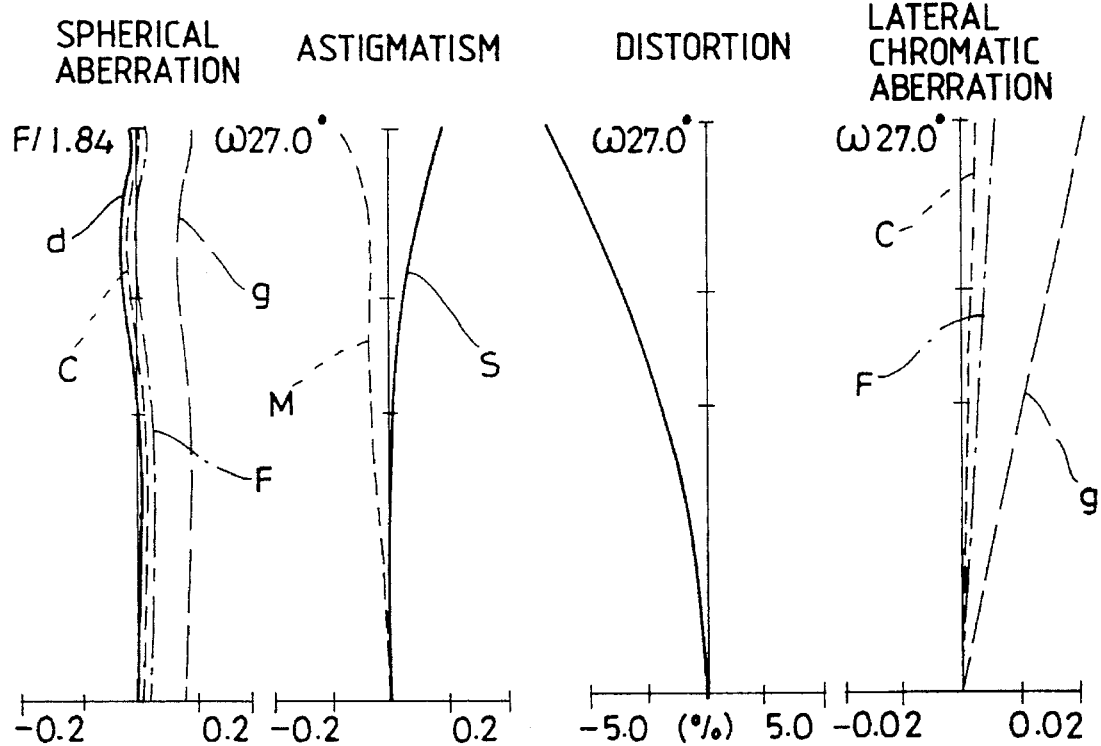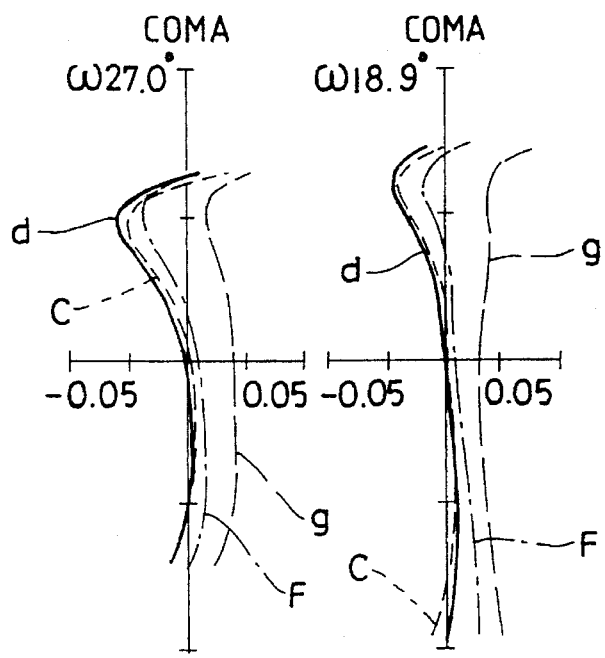

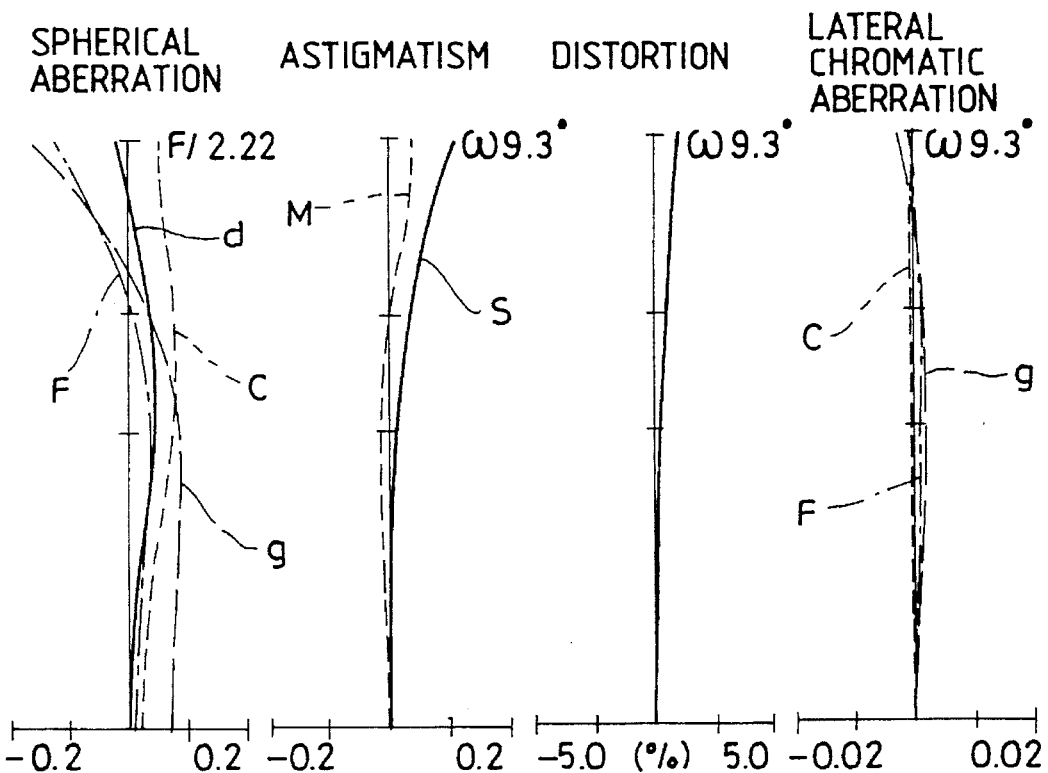
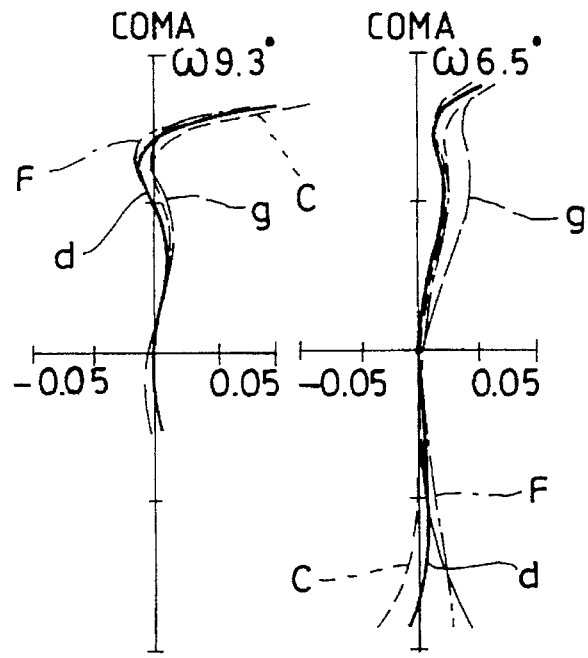

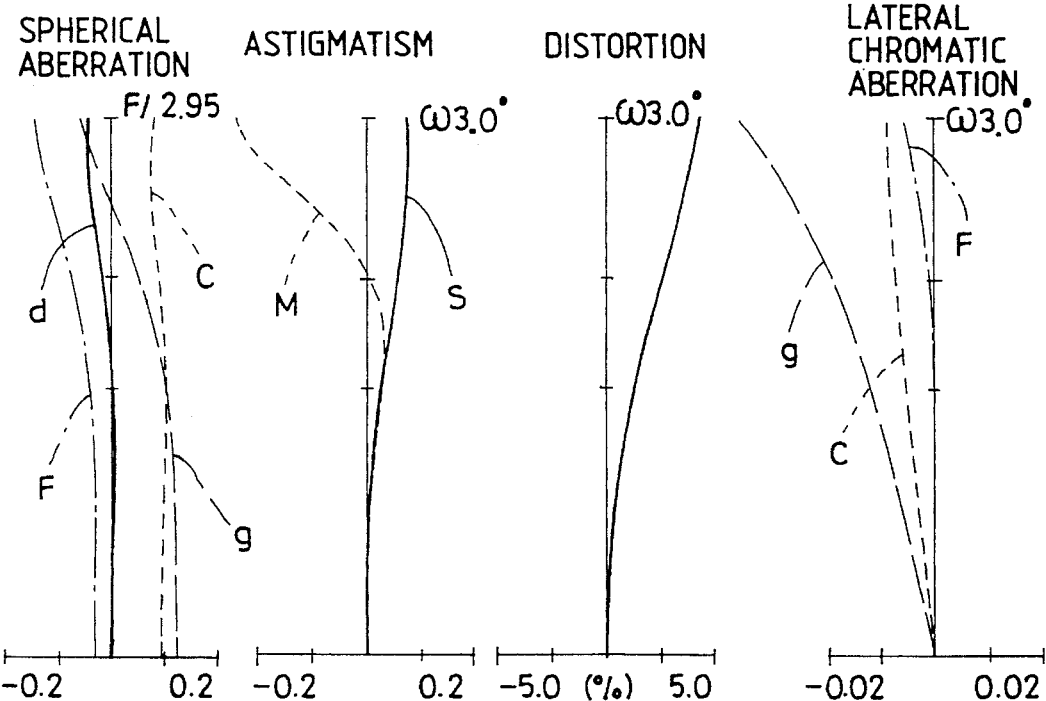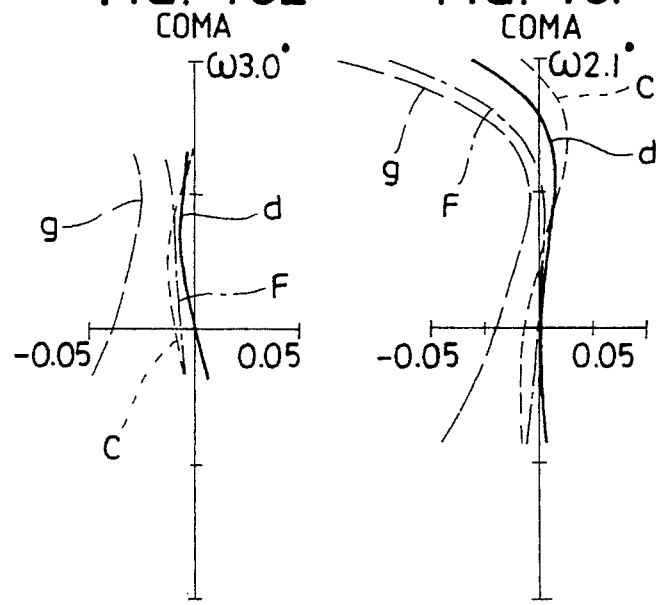

VARI-FOCAL LENS SYSTEM

BACKGROUND OF THE INVENTION a) Field of the Invention

The present invention relates to a vari-focal lens system, and more specifically a vari-focal lens system which is suited for use with video cameras.

b) Description of the Prior Art

It is strongly demanded in these days to configure zoom lens systems for video cameras such that they are compact. Further, it is required to configure the zoom lens systems for video cameras so as to have high vari-focal ratios and wide field angles at wide-angle positions thereof. However, conventional zoom lens systems are not sufficiently satisfactory as exemplified by the zoom lens system disclosed by Japanese Patent Kokai Publication No. Hei 5-60,973 which is fairly compact but has a zoom ratio of approximately 8 and a field angle 2ω of 55° at a wide-angle position thereof. This conventional zoom lens system has a total length of approximately 19 times that of the product of the focal length at the wide position multiplied by the tangent of half the field angle thereof. This zoom lens system consists, in order from the object side, of a first lens unit which has a positive refractive power and is always kept stationary, a second lens unit which has a negative refractive power and is movable for varying a focal length of the vari-focal lens system, a third lens unit which has a positive refractive power and is always kept stationary, and a fourth lens unit which has a positive refractive power and is movable for correcting a deviation of a focal point of the vari-focal lens system which is caused due to the variation of the focal length or a shift of an object point. A zoom lens system which is composed as described above has a defect that a total length of the zoom lens system and a diameter of a front lens component used in the lens system are remarkably large when the lens system is configured so as to have a wide field angle.

SUMMARY OF THE INVENTION

A primary object of the present invention is to provide a vari-focal lens system which has a vari-focal ratio of approximately 10, a field angle 2ω of 74° at a wide-angle position thereof, or remarkably wider than that of the conventional zoom lens system, a total length approximately 25 times that of the product of the focal length thereof at the wide position multiplied by the tangent of half a field angle at the wide position and a total length approximately 30 times that of a product of a focal length thereof at a telephoto position multiplied by tangent of half a field angle at the telephoto position. (Hereafter, the wide-angle position will sometimes be referred to as the wide position, and the telephoto position will sometimes be referred to as tele position.

Another object of the present invention is to provide a vari-focal lens system which has a field angle 2ω of 54° at the wide position thereof, a vari-focal ratio of approximately 10, a short total length, at the wide position in particular, i.e., approximately 16 times that of a product of a focal length at the wide position multiplied by the tangent of half a field angle at the wide position, and a total length of approximately 20 times that of a product of a focal length at the tele position multiplied by the tangent of half a field angle at the tele position.

The vari-focal lens system according to the present invention comprises at least four lens units: a first lens unit having a positive refractive power, a second lens unit having a negative refractive power, a third lens unit having a positive refractive power and a fourth lens unit having a positive refractive power which are disposed in order from the object side. For setting the vari-focal lens system according to the present invention at the focal length at the telephoto position from that at the wide position, the first lens unit is moved monotonically toward the object side, the second lens unit is moved monotonically toward the image side, the third lens unit is set at a location on the object side of its original location which it had at the wide-angle position and the fourth lens unit is moved from a location thereof for focusing the vari-focal lens system on an object located effectively at infinite distance so as to reserve an airspace between the third lens unit and the fourth lens unit which is wider than the airspace reserved between these lens units at the wide-angle position. Further, for accomplishing the objects of the present invention and enhancing optical performance of the vari-focal lens system, it is desirable to configure the lens system so as to satisfy at least any one of the conditions which are to be described consecutively below. It is possible to obtain enhanced effects of the vari-focal lens system according to the present invention by configuring the lens system so as to satisfy a plurality of the conditions at the same time.

One of the conditions which are to be satisfied by the vari-focal lens system according to the present invention is the following condition (1):

$$0.5 < f_4/f_3 < 1.4 \tag{1}$$

wherein the reference symbol $f_3$ and $f_4$ represent focal lengths of the third lens unit and the fourth lens unit respectively.

The condition (1) defines the ratio between a focal length of the third lens unit and that of a fourth lens unit. If the upper limit of 1.4 of the condition (1) is exceeded, aberrations, spherical aberration and coma in particular, will tend to vary remarkably by varying a focal length of the vari-focal lens system, or it will be difficult to correct a deviation of an image point which is caused by the variation of the focal length. If the lower limit of 0.5 of the condition (1) is exceeded, on the other hand, the vari-focal lens system will tend to have a long total length.

Then, it is desirable for the vari-focal lens system according to the present invention to satisfy the condition (2) shown below:

$$0.81 < D_T/f_W < 6.5 \tag{2}$$

wherein the reference symbol $f_W$ represents a focal length of the vari-focal lens system as a whole at the wide position thereof when it is focused on the object located at infinite distance, and the reference symbol $D_T$ designates an airspace which is reserved between the third lens unit and the fourth lens unit when the vari-focal lens system is focused on the object located at infinite distance.

If the lower limit of 0.81 of the condition (2) is exceeded, it will be hard to favorably correct spherical aberration, coma and astigmatism at all positions of the vari-focal lens system, when it uses a front lens component having a small diameter and such that it has a short total length, thereby making it difficult to correct the deviation of the focal point caused by the variation of focal length and properly focus the vari-focal lens system. If the upper limit of 6.5 of the condition (2) is exceeded, the vari-focal lens system will have a long total length.

Still another condition to be satisfied by the vari-focal lens system according to the present invention is the following condition (3):

$$-0.6 < f_T/f_{AT} < 0.6 \tag{3}$$

wherein the reference symbol $f_T$ represents a focal length of the vari-focal lens system as a whole at the tele position thereof when it is focused on the object located at infinite distance and the reference symbol $f_{AT}$ designates a total focal length of the first lens unit, the second lens unit and third lens unit at the tele position.

The condition (3) defines a total focal length of the first lens unit, the second lens unit and the third lens unit. If the upper limit of 0.6 or the lower limit of −0.6 of the condition (3) is exceeded, spherical aberration will be varied remarkably by focusing the vari-focal lens system.

Further, the present invention defines a moving mode and a moving distance for each of the four lens units so as to configure the vari-focal lens system compactly. When the conventional zoom lens system has a wide field angle without modifying the moving modes for the lens units described above, heights of rays are large on the first lens unit at focal lengths within a range from a focal length at the wide position and an intermediate focal length, and this lens unit inevitably has a large diameter due to the fact that the zoom lens system has an entrance pupil located deep inside the lens system from a first lens surface thereof within the range of focal lengths described above. In order to correct this defect, it is necessary to dispose the first lens unit at a location as close to an aperture stop as possible within the range of focal lengths described above. The aperture stop is ordinarily disposed between the second lens unit and the third lens unit or in the third lens unit.

Furthermore, variations of the focal length of the vari-focal lens system are influenced most predominantly by variations of an airspace reserved between the first lens unit and the second lens unit as well as variations of another airspace reserved between the second lens unit and the third lens unit. For configuring the vari-focal lens system so as to be compact and have a wide field angle while maintaining the high vari-focal ratio, it is therefore desirable to move the first lens unit and the second lens unit in directions which are opposite to each other such that distances traversed by the lenses remain within a range defined by the following condition (4):

$$-2.0 < (x_{2T} - x_{2W})/(x_{1T} - x_{1W}) < -0.3 \tag{4}$$

wherein the reference symbol $(x_{iT} - x_{iW})$ represents a distance for which an i'th lens unit is to be moved going from the wide-angle to telephoto position from that, i.e., the reference symbol $(x_{1T} - x_{1W})$ designates a moving distance for the first lens unit and the reference symbol $(x_{2T} - x_{2W})$ denotes a moving distance for the second lens unit.

The condition (4) defines a ratio between the moving distance for the first lens unit and that for the second lens unit. If the upper limit of −0.3 of the condition (4) is exceeded, the first lens unit will tend to have a large diameter when the vari-focal lens system has a wide field angle. If the lower limit of −2.0 of the condition (4) is exceeded, in contrast, the vari-focal lens system will tend to have a long total length at the tele position, or it can hardly have a high vari-focal ratio.

It is also desirable to move the second lens unit and the third lens unit in directions which are opposite to each other, and for distances within a range defined by the following condition (5):

$$-1.2 < (x_{3T} - x_{3W})/(x_{2T} - x_{2W}) < -0.3 \tag{5}$$

wherein the reference symbol $(x_{3T} - x_{3W})$ represents a distance for which the third lens unit is to be moved going from the wide-angle to the telephoto position.

The condition (5) defines a ratio between the moving distance for the second lens unit and that for the third lens unit. If the upper limit of −0.3 of the condition (5) is exceeded, the vari-focal lens system will tend to have a large F number or be dark at the tele position. If the lower limit of −1.2 of the condition (5) is exceeded, in contrast, the first lens unit will tend to have a large diameter when the vari-focal lens system has a wide field angle, thus the high vari-focal ratio of the lens system will be difficult to obtain or the vari-focal lens system will tend to have a long total length.

Moreover, it is desirable to select moving modes, moving loci in particular, for the lens units as described below:

For the first lens unit, it is desirable to move it so as to satisfy the following condition (6):

$$0.12 < (x_{1S} - x_{1W})/(x_{1T} - x_{1W}) < 0.7 \tag{6}$$

wherein the reference symbol $(x_{1S} - x_{1W})$ represents a distance for which the i'th lens unit is to be moved for setting the vari-focal lens system at an intermediate focal length $f_S [(f_S = (f_W \cdot f_T)^{1/2}]$ from the focal length at the wide position, i.e., the reference symbol $(x_{1S} - x_{1W})$ designates a moving distance for the first lens unit.

From viewpoints of both a paraxial power distribution and aberrations, it is desirable to move the first lens unit along a locus which is slightly convex on the object side. If the upper limit of 0.7 of the condition (6) is exceeded, offaxial rays will tend to be eclipsed by the first lens unit at focal lengths within the range from that at the wide position to the intermediate focal length, thereby making it difficult to reserve the marginal rays in a required quantity. If the lower limit of 0.12 of the condition (6) is exceeded, in contrast, it will tend to be difficult to correct the deviations of focal lengths which are caused by the variations of the focal lengths.

For the second lens unit, it is desirable to move it along a locus satisfying the following condition (7):

$$0.45 < (x_{2S} - x_{2W})/(x_{2T} - x_{2W}) < 0.9 \tag{7}$$

wherein the reference symbol $(x_{2S} - x_{2W})$ represents a distance for which the second lens unit is to be moved to set the vari-focal lens system at the intermediate focal length from that at the wide position.

Since the moving locus for the first lens unit which is convex on the object side should desirably be convex as slightly as possible, it is desirable to move the second lens unit along a locus which is slightly convex on the image side. If the upper limit of 0.9 of the condition (7) is exceeded, the vari-focal lens system will tend to have a long total length at the tele position. If the lower limit of 0.45 of the condition (7) is exceeded, in contrast, the moving locus for the first lens unit will undesirably tend to be convex on the object side, thereby making it difficult to reserve the required quantity of the marginal rays or correct the deviations of the focal lengths which are caused by the variations of the focal lengths.

In order to further reduce the diameter of the front lens component or locate the entrace pupil closer to the first surface of the vari-focal lens system at the focal lengths within the range from that at the wide position to the intermediate focal length, it is desirable that the moving locus for the second lens unit is not convex so remarkably on the image side. For this reason, it is desirable to move the third lens unit, in the vicinity of the wide position, along a locus which is steeply convex on the object side. It is further desirable to move the third lens unit unidirectionally for setting the vari-focal lens system at the tele position from the wide position. For the third lens unit, it is preferable to move it along a locus satisfying the following condition (8):

$$0.45 < (x_{3S} - x_{3W})/(x_{3T} - x_{3W}) < 0.9 \tag{8}$$

wherein the reference symbol $(x_{3S} - x_{3W})$ represents a distance for which the third lens unit is to be moved for setting the vari-focal lens system at the intermediate focal length from that at the wide position.

If the lower limit of 0.45 of the condition (8) is exceeded, the moving locus for the second lens unit will tend to be steep in the vicinity of the wide position and the first lens unit will tend to have a large diameter. If the upper limit of 0.9 of the condition (8) is exceeded, in contrast, it will be difficult to correct the deviations of the focal lengths which are cuased by the variations of the focal lengths.

The fourth lens unit, which causes little variations of magnifications of the vari-focal lens system due to movements thereof, is moved mainly for correcting deviations of focal point and focusing of the vari-focal lens system.

All the conditions which have been described above are required for reducing the diameter of the first lens unit, or locating the entrance pupil as close to the first surface as possible at the focal lengths within the range from that at the wide position to the intermediate focal length. Since the focal point of the vari-focal lens system is apt to be varied steeply by changing a magnification of the lens system even when the conditions are satisfied, the fourth lens unit is apt to be moved, from a location thereof for setting the vari-focal lens system in focus on an object located at infinite distance, along a locus which is remarkably convex on the object side for correcting the variation of the focal point. In order to solve this problem, it is desirable to dispose an aperture stop between the fourth lens unit and an image surface of the vari-focal lens system.

It is more desirable to dispose a negative lens component on the image side in the third lens unit and select for the negative lens component a shape which satisfies the following condition (9):

$$0.8 < (r_{31} + r_{32})/(r_{31} - r_{32}) < 3.0 \tag{9}$$

wherein the reference symbols $r_{31}$ and $r_{32}$ represent radii of curvature on an object side surface and an image side surface respectively of the negative lens component to be disposed in the third lens unit.

The condition (9) defines a shape factor for the negative lens component. If the upper limit of 3.0 of the condition (9) is exceeded, it will be difficult to correct spherical aberration. If the lower limit of 0.8 of the condition (9) is exceeded, in contrast, the negative lens component will have a shape which is undesirable for configuring the vari-focal lens system compactly.

Further, it is desirable to dispose a positive lens component in the fourth lens unit and configure this lens component so as to have a shape satisfying the following condition (10):

$$-1.1 < (r_{41} + r_{42})/(r_{41} - r_{42}) < 0.5 \tag{10}$$

wherein the reference symbols $r_{41}$ and $r_{42}$ represent radii of curvature on an object side surface and an image side surface respectively of the positive lens component to be disposed in the fourth lens unit.

The condition (10) defines a shape factor for the positive lens component to be disposed in the fourth lens unit. If the upper limit of 0.5 or the lower limit of −1.1 of the condition (10) is exceeded, aberrations, spherical aberration and coma in particular, will tend to be varied remarkably by focusing the vari-focal lens system.

It is desirable that the lens units of the vari-focal lens system according to the present invention are composed as described below. The first lens unit is composed, in order from the object side, of a negative meniscus lens component, a positive lens component and a positive lens component; the second lens unit is composed, in order from the object side, of a negative lens component, a negative lens component and a positive lens component; the third lens unit is composed, in order from the object side, of a positive lens component consisting of at least one positive lens element and a lens component comprising a negative lens element; and the fourth lens unit is composed of a single positive lens element.

Further, it is desirable to compose the third lens unit of a positive lens component consisting of two positive lens elements and a negative lens element; or a positive lens component consisting of a positive lens element and a cemented lens component consisting of a positive lens element and a negative lens element.

BRIEF DESCRIPTION OF THE DRAWINGS

FIGS. 5A, 5B, 5C, 5D, 5E and 5F show graphs illustrating aberration characteristics at a wide position of the first embodiment of the present invention;

FIGS. 6A, 6B, 6C, 6D, 6E and 6F show graphs visualizing aberration characteristics at an intermediate focal length of the first embodiment of the present invention;

FIGS. 7A, 7B, 7C, 7D, 7E and 7F show curves visualizing aberration characteristics at a tele position of the first embodiment of the present invention;

FIGS. 8A, 8B, 8C, 8D, 8E and 8F show curves illustrating aberration characteristics at the wide position of the second embodiment of the present invention;

FIGS. 9A, 9B, 9C, 9D, 9E and 9F show curves visualizing aberration characteristics at the intermediate focal length of the second embodiment of the present invention;

FIGS. 10A, 10B, 10C, 10D, 10E and 10F show graphs illustrating aberration characteristics at the tele position of the second embodiment of the present invention;

FIGS. 11A, 11B, 11C, 11D, 11E and 11F show curves visualizing aberration characteristics at the wide position of the third embodiment of the present invention;

FIGS. 12A, 12B, 12C, 12D, 12E and 12F show curves illustrating aberration characteristics at the intermediate focal length of the third embodiment of the present invention;

FIGS. 13A, 13B, 13C, 13D, 13E and 13F show graphs illustrating aberration characteristics at the tele position of the third embodiment of the present invention;

FIGS. 14A, 14B, 14C, 14D, 14E and 14F show graphs visualizing aberration characteristics of the fourth embodiment of the present invention;

FIGS. 15A, 15B, 15C, 15D, 15E and 15F show graphs illustrating aberration characteristics at the intermediate focal length of the fourth embodiment of the present invention; and FIGS. 16A, 16B, 16C, 16D, 16E and 16F show curves visualizing aberration characteristics of the fourth embodiment of the present invention.

DETAILED DESCRIPTION OF THE PREFERRED EMBODIMENTS

Figure 1A:
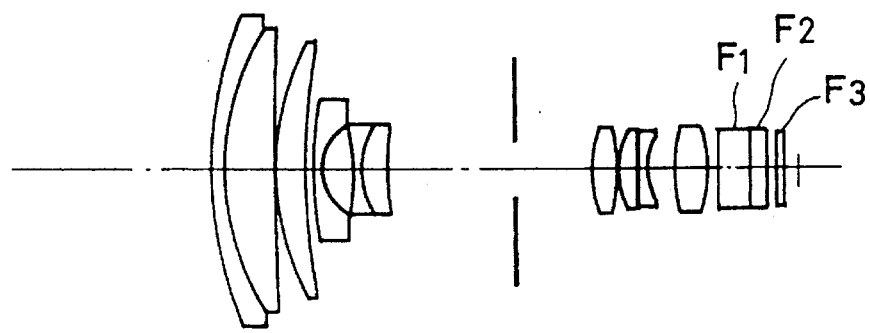
FIG. 1A shows a sectional view illustrating a composition at a wide position of a first embodiment of the vari-focal lens system according to the present invention.

Now, the vari-focal lens system according to the present invention will be described in more detail below with reference to the preferred embodiments illustrated in the accompanying drawings and given in the form of the numerical data shown below:

First Embodiment $f = 3.000 \sim 9.487 \sim 30.000$, F number = 1.8~2.66
$2\omega = 76° \sim 28° \sim 9°$ $r_1 = 39.0193$
$\quad d_1 = 1.3000 \quad\quad n_1 = 1.84666 \quad\quad v_1 = 23.78$
$r_2 = 25.9933$
$\quad d_2 = 4.5500 \quad\quad n_2 = 1.60311 \quad\quad v_2 = 60.70$
$r_3 = 481.7068$
$\quad d_3 = 0.1500$
$r_4 = 25.6340$
$\quad d_4 = 2.7000 \quad\quad n_3 = 1.48749 \quad\quad v_3 = 70.20$
$r_5 = 62.6362$
$\quad d_5 = D_1$ (variable)

First Embodiment (continued)

$r_6 = 37.6831$
$\quad d_6 = 0.7000 \quad\quad n_4 = 1.77250 \quad\quad v_4 = 49.66$
$r_7 = 4.4840$
$\quad d_7 = 2.9233$
$r_8 = -15.7196$
$\quad d_8 = 0.7000 \quad\quad n_5 = 1.48749 \quad\quad v_5 = 70.20$
$r_9 = 6.9803$
$\quad d_9 = 2.4000 \quad\quad n_6 = 1.80518 \quad\quad v_6 = 25.43$
$r_{10} = 24.3972$ (aspherical surface)
$\quad d_{10} = D_2$ (variable)
$r_{11} = \infty$ (stop)
$\quad d_{11} = D_3$ (variable)
$r_{12} = 11.0062$ (aspherical surface)
$\quad d_{12} = 2.3500 \quad\quad n_7 = 1.66910 \quad\quad v_7 = 55.40$
$r_{13} = -19.5384$
$\quad d_{13} = 0.1500$
$r_{14} = 9.0664$
$\quad d_{14} = 1.8724 \quad\quad n_8 = 1.60311 \quad\quad v_8 = 60.70$
$r_{15} = 436.7748$
$\quad d_{15} = 0.7000 \quad\quad n_9 = 1.84666 \quad\quad v_9 = 23.78$
$r_{16} = 6.9721$
$\quad d_{16} = D_4$ (variable)
$r_{17} = 16.3017$ (aspherical surface)
$\quad d_{17} = 3.1000 \quad\quad n_{10} = 1.66910 \quad\quad v_{10} = 55.40$
$r_{18} = -13.9573$
$\quad d_{18} = D_5$ (variable)
$r_{19} = \infty$
$\quad d_{19} = 2.9000 \quad\quad n_{11} = 1.54771 \quad\quad v_{11} = 62.83$
$r_{20} = \infty$
$\quad d_{20} = 1.6000 \quad\quad n_{12} = 1.52427 \quad\quad v_{12} = 70.20$
$r_{21} = \infty$
$\quad d_{21} = 1.0000$
$r_{22} = \infty$
$\quad d_{22} = 0.7500 \quad\quad n_{13} = 1.48749 \quad\quad v_{13} = 70.20$
$r_{23} = \infty$ aspherical surface coefficients (tenth surface) $E = -0.27798 \times 10^{-3}$, $F = 0.27756 \times 10^{-4}$
$G = -0.33300 \times 10^{-5}$, $H = 0.11627 \times 10^{-6}$
(twelfth surface) $E = -0.32921 \times 10^{-3}$, $F = 0.16336 \times 10^{-4}$
$G = -0.12277 \times 10^{-5}$, $H = 0.26872 \times 10^{-7}$
(seventeenth surface) $E = -0.23109 \times 10^{-3}$, $F = 0.23560 \times 10^{-4}$
$G = -0.29214 \times 10^{-5}$, $H = 0.12596 \times 10^{-6}$

| f | 3.000 | 9.487 | 30.000 |
|---|---|---|---|
| $D_1$ | 0.800 | 13.362 | 26.430 |
| $D_2$ | 11.694 | 3.777 | 1.200 |
| $D_3$ | 7.102 | 2.948 | 1.500 |
| $D_4$ | 2.501 | 3.094 | 3.680 |
| $D_5$ | 1.000 | 4.561 | 5.423 |

$f_4/f_3 = 0.8395$, $D_T/f_W = 1.227$, $f_T/f_{AT} = -0.02459$
$(x_{2T} - x_{2W})/(x_{1T} - x_{1W}) = -0.6933$
$(x_{3T} - x_{3W})/(x_{2T} - x_{2W}) = -0.5338$
$(x_{1S} - x_{1W})/(x_{1T} - x_{1W}) = 0.3069$
$(x_{2S} - x_{2W})/(x_{2T} - x_{2W}) = 0.7544$
$(x_{3S} - x_{3W})/(x_{3T} - x_{3W}) = 0.7415$
$(r_{31} + r_{32})/(r_{31} - r_{32}) = 1.0324$
$(r_{41} + r_{42})/(r_{41} - r_{42}) = 0.07748$

Second Embodiment $f = 3.000 \sim 9.487 \sim 30.000$, F number = 1.78~2.52
$2\omega = 76° \sim 28° \sim 9°$ $r_1 = 49.7073$
$\quad d_1 = 1.3000 \quad\quad n_1 = 1.84666 \quad\quad v_1 = 23.78$
$r_2 = 30.4691$
$\quad d_2 = 4.5491 \quad\quad n_2 = 1.60311 \quad\quad v_2 = 60.70$
$r_3 = -725.2157$
$\quad d_3 = 0.1500$
$r_4 = 27.5499$
$\quad d_4 = 2.7000 \quad\quad n_3 = 1.60311 \quad\quad v_3 = 60.70$
$r_5 = 68.1671$
$\quad d_5 = D_1$ (variable)
$r_6 = 43.5360$
$\quad d_6 = 0.8000 \quad\quad n_4 = 1.69680 \quad\quad v_4 = 55.52$

Second Embodiment

| | | | |
|---|---|---|---|
| $r_7 = 4.7795$ | | | |
| | $d_7 = 3.6815$ | | |
| $r_8 = -13.8668$ | | | |
| | $d_8 = 0.7000$ | $n_5 = 1.48749$ | $v_5 = 70.20$ |
| $r_9 = 9.6896$ | | | |
| | $d_9 = 2.6180$ | $n_6 = 1.80518$ | $v_6 = 25.43$ |
| $r_{10} = 35.1743$ (aspherical surface) | | | |
| | $d_{10} = D_2$ (variable) | | |
| $r_{11} = \infty$ (stop) | | | |
| | $d_{11} = D_3$ (variable) | | |
| $r_{12} = 7.0659$ (aspherical surface) | | | |
| | $d_{12} = 2.8000$ | $n_7 = 1.59008$ | $v_7 = 61.20$ |
| $r_{13} = -22.9815$ | | | |
| | $d_{13} = 0.1500$ | | |
| $r_{14} = 26.1008$ | | | |
| | $d_{14} = 1.6404$ | $n_8 = 1.72000$ | $v_8 = 50.25$ |
| $r_{15} = -95.9771$ | | | |
| | $d_{15} = 0.1500$ | | |
| $r_{16} = 38.8657$ | | | |
| | $d_{16} = 0.7106$ | $n_9 = 1.80518$ | $v_9 = 25.43$ |
| $r_{17} = 6.1862$ | | | |
| | $d_{17} = D_4$ (variable) | | |
| $r_{18} = 9.9051$ (aspherical surface) | | | |
| | $d_{18} = 2.9000$ | $n_{10} = 1.59008$ | $v_{10} = 61.20$ |
| $r_{19} = -19.2302$ | | | |
| | $d_{19} = D_5$ (variable) | | |
| $r_{20} = \infty$ | | | |
| | $d_{20} = 2.9000$ | $n_{11} = 1.54771$ | $v_{11} = 62.83$ |
| $r_{21} = \infty$ | | | |
| | $d_{21} = 1.6000$ | $n_{12} = 1.52427$ | $v_{12} = 70.20$ |
| $r_{22} = \infty$ | | | |
| | $d_{22} = 1.0000$ | | |
| $r_{23} = \infty$ | | | |
| | $d_{23} = 0.7500$ | $n_{13} = 1.48749$ | $v_{13} = 70.20$ |
| $r_{24} = \infty$ | | | | aspherical surface coefficients

| | | |
|---|---|---|
| (tenth surface) | $E = -0.21323 \times 10^{-3}$, | $F = 0.19758 \times 10^{-5}$ |
| | $G = -0.49757 \times 10^{-7}$, | $H = 0.46641 \times 10^{-10}$ |
| (twelfth surface) | $E = -0.58821 \times 10^{-3}$, | $F = 0.95721 \times 10^{-5}$ |
| | $G = -0.11022 \times 10^{-5}$, | $H = 0.20949 \times 10^{-7}$ |
| (eighteenth surface) | $E = -0.26826 \times 10^{-3}$, | $F = 0.28801 \times 10^{-4}$ |
| | $G = -0.57580 \times 10^{-5}$, | $H = 0.31384 \times 10^{-6}$ |

| | | | |
|---|---|---|---|
| f | 3.000 | 9.487 | 30.000 |
| $D_1$ | 0.800 | 13.250 | 25.013 |
| $D_2$ | 13.593 | 3.529 | 1.000 |
| $D_3$ | 7.200 | 4.098 | 1.200 |
| $D_4$ | 2.160 | 2.004 | 3.319 |
| $D_5$ | 0.900 | 4.158 | 5.742 |

$f_4/f_3 = 0.7530$, $D_T/f_W = 1.106$, $f_T/f_{AT} = -0.1019$
$(x_{2T} - x_{2W})/(x_{1T} - x_{1W}) = -1.0838$
$(x_{3T} - x_{3W})/(x_{2T} - x_{2W}) = -0.4765$
$(x_{1S} - x_{1W})/(x_{1T} - x_{1W}) = 0.2053$
$(x_{2S} - x_{2W})/(x_{2T} - x_{2W}) = 0.7992$
$(x_{3S} - x_{3W})/(x_{3T} - x_{3W}) = 0.5170$
$(r_{31} + r_{32})/(r_{31} - r_{32}) = 1.3786$
$(r_{41} + r_{42})/(r_{41} - r_{42}) = -0.3201$

Third Embodiment $f = 8.200 \sim 25.612 \sim 80.000$, F number = $1.85 \sim 2.95$
$2\omega = 54° \sim 18.6° \sim 6.0°$

| | | | |
|---|---|---|---|
| $r_1 = 59.1400$ | | | |
| | $d_1 = 1.2000$ | $n_1 = 1.84666$ | $v_1 = 23.78$ |
| $r_2 = 33.7579$ | | | |
| | $d_2 = 4.2000$ | $n_2 = 1.56873$ | $v_2 = 63.16$ |
| $r_3 = -5674.2766$ | | | |
| | $d_3 = 0.1500$ | | |
| $r_4 = 32.7237$ | | | |
| | $d_4 = 3.4000$ | $n_3 = 1.63854$ | $v_3 = 55.38$ |
| $r_5 = 128.2877$ | | | |
| | $d_5 = D_1$ (variable) | | |
| $r_6 = 85.8683$ | | | |
| | $d_6 = 1.0000$ | $n_4 = 1.85026$ | $v_4 = 32.28$ |
| $r_7 = 7.4123$ | | | |
| | $d_7 = 3.0000$ | | |
| $r_8 = -13.7010$ | | | |
| | $d_8 = 1.0000$ | $n_5 = 1.48749$ | $v_5 = 70.20$ |
| $r_9 = 9.9296$ | | | |
| | $d_9 = 3.0000$ | $n_6 = 1.80518$ | $v_6 = 25.43$ |
| $r_{10} = -172.7422$ (aspherical surface) | | | |
| | $d_{10} = D_2$ (variable) | | |
| $r_{11} = \infty$ (stop) | | | |
| | $d_{11} = D_3$ (variable) | | |
| $r_{12} = 8.9287$ (aspherical surface) | | | |
| | $d_{12} = 4.1000$ | $n_7 = 1.58913$ | $v_7 = 61.18$ |
| $r_{13} = 1175.1078$ | | | |
| | $d_{13} = 0.1500$ | | |
| $r_{14} = 15.2025$ | | | |
| | $d_{14} = 2.3000$ | $n_8 = 1.48749$ | $v_8 = 70.20$ |
| $r_{15} = 93.2588$ | | | |
| | $d_{15} = 0.1500$ | | |
| $r_{16} = 16.0586$ | | | |
| | $d_{16} = 0.9000$ | $n_9 = 1.84666$ | $v_9 = 23.78$ |
| $r_{17} = 6.5439$ | | | |
| | $d_{17} = D_4$ (variable) | | |
| $r_{18} = 10.4064$ (aspherical surface) | | | |
| | $d_{18} = 3.5000$ | $n_{10} = 1.48749$ | $v_{10} = 70.20$ |
| $r_{19} = -101.7286$ | | | |
| | $d_{19} = D_5$ (variable) | | |
| $r_{20} = \infty$ | | | |
| | $d_{20} = 5.5500$ | $n_{11} = 1.51633$ | $v_{11} = 64.15$ |
| $r_{21} = \infty$ | | | | aspherical surface coefficients

| | | |
|---|---|---|
| (tenth surface) | $E = 0.41549 \times 10^{-4}$, | $F = -0.45707 \times 10^{-5}$ |
| | $G = 0.23628 \times 10^{-6}$, | $H = -0.37730 \times 10^{-8}$ |
| (twelfth surface) | $E = -0.15559 \times 10^{-3}$, | $F = -0.10489 \times 10^{-5}$ |
| | $G = -0.15414 \times 10^{-8}$, | $H = -0.28881 \times 10^{-9}$ |
| (eighteenth surface) | $E = -0.64665 \times 10^{-4}$, | $F = -0.32357 \times 10^{-5}$ |
| | $G = 0.11063 \times 10^{-6}$, | $H = -0.12647 \times 10^{-8}$ |

| | | | |
|---|---|---|---|
| f | 8.200 | 25.612 | 80.000 |
| $D_1$ | 1.000 | 19.409 | 31.267 |
| $D_2$ | 12.310 | 4.800 | 1.000 |
| $D_3$ | 7.891 | 4.000 | 2.000 |
| $D_4$ | 4.636 | 5.400 | 16.168 |
| $D_5$ | 6.641 | 9.768 | 1.000 |

$f_4/f_3 = 0.8832$, $D_T/f_W = 1.972$, $f_T/f_{AT} = 0.5491$
$(x_{2T} - x_{2W})/(x_{1T} - x_{1W}) = -0.5966$
$(x_{3T} - x_{3W})/(x_{2T} - x_{2W}) = -0.5209$
$(x_{1S} - x_{1W})/(x_{1T} - x_{1W}) = 0.5749$
$(x_{2S} - x_{2W})/(x_{2T} - x_{2W}) = 0.6640$
$(x_{3S} - x_{3W})/(x_{3T} - x_{3W}) = 0.6605$
$(r_{31} + r_{32})/(r_{31} - r_{32}) = 2.3755$
$(r_{41} + r_{42})/(r_{41} - r_{42}) = -0.8144$

Fourth Embodiment $f = 8.200 \sim 25.612 \sim 80.000$, F number = $1.84 \sim 2.33$
$2\omega = 54° \sim 18.6° \sim 6.0°$

| | | | |
|---|---|---|---|
| $r_1 = 54.2119$ | | | |
| | $d_1 = 1.2000$ | $n_1 = 1.84666$ | $v_1 = 23.78$ |
| $r_2 = 31.4943$ | | | |
| | $d_2 = 4.8000$ | $n_2 = 1.56873$ | $v_2 = 63.16$ |
| $r_3 = -688.7710$ | | | |
| | $d_3 = 0.1500$ | | |
| $r_4 = 30.1869$ | | | |
| | $d_4 = 3.4000$ | $n_3 = 1.60311$ | $v_3 = 60.70$ |
| $r_5 = 116.1649$ | | | |
| | $d_5 = D_1$ (variable) | | |
| $r_6 = 116.1422$ | | | |
| | $d_6 = 1.0000$ | $n_4 = 1.85026$ | $v_4 = 32.28$ |
| $r_7 = 7.2333$ | | | |
| | $d_7 = 2.6500$ | | |
| $r_8 = -16.2486$ | | | |
| | $d_8 = 1.0000$ | $n_5 = 1.48749$ | $v_5 = 70.20$ |
| $r_9 = 7.7276$ | | | |
| | $d_9 = 2.8000$ | $n_6 = 1.84666$ | $v_6 = 23.78$ |

Fourth Embodiment $r_{10} = 46.5144$ (aspherical surface)
  $d_{10} = D_2$ (variable)
$r_{11} = \infty$ (stop)
  $d_{11} = D_3$ (variable)
$r_{12} = 9.4559$ (aspherical surface)
  $d_{12} = 4.4000$   $n_7 = 1.67790$   $v_7 = 55.33$
$r_{13} = -103.5192$
  $d_{13} = 0.1500$
$r_{14} = 12.2391$
  $d_{14} = 2.8000$   $n_8 = 1.60311$   $v_8 = 60.70$
$r_{15} = 86.5864$
  $d_{15} = 0.1400$
$r_{16} = 121.8855$
  $d_{16} = 0.9000$   $n_9 = 1.84666$   $v_9 = 23.78$
$r_{17} = 6.3995$
  $d_{17} = D_4$ (variable)
$r_{18} = 11.0973$ (aspherical surface)
  $d_{18} = 3.4000$   $n_{10} = 1.67790$   $v_{10} = 55.33$
$r_{19} = -96.4370$
  $d_{19} = D_5$ (variable)
$r_{20} = \infty$
  $d_{20} = 5.5500$   $n_{11} = 1.51633$   $v_{11} = 64.15$
$r_{21} = \infty$ aspherical surface coefficients

| | | | |
|---|---|---|---|
| (tenth surface) | $E = 0.69288 \times 10^{-4}$, | $F = 0.56374 \times 10^{-6}$ | |
| | $G = 0.22489 \times 10^{-7}$, | $H = 0.60499 \times 10^{-9}$ | |
| (twelfth surface) | $E = -0.12378 \times 10^{-3}$, | $F = -0.43198 \times 10^{-6}$ | |
| | $G = -0.14125 \times 10^{-7}$, | $H = -0.23172 \times 10^{-10}$ | |
| (eighteenth surface) | $E = -0.88280 \times 10^{-4}$, | $F = -0.13019 \times 10^{-5}$ | |
| | $G = 0.80155 \times 10^{-7}$, | $H = -0.11914 \times 10^{-8}$ | |
| f | 8.200 | 25.612 | 80.000 |
| $D_1$ | 1.000 | 18.190 | 28.900 |
| $D_2$ | 10.691 | 4.698 | 1.000 |
| $D_3$ | 7.287 | 4.000 | 2.000 |
| $D_4$ | 3.482 | 3.863 | 13.982 |
| $D_5$ | 6.214 | 9.119 | 1.000 |

$f_4/f_3 = 0.6978$, $D_T/f_W = 1.705$, $f_T/f_{AT} = 0.4290$
$(x_{2T} - x_{2W})/(x_{1T} - x_{1W}) = -0.5322$
$(x_{3T} - x_{3W})/(x_{2T} - x_{2W}) = -0.5456$
$(x_{1S} - x_{1W})/(x_{1T} - x_{1W}) = 0.6149$
$(x_{2S} - x_{2W})/(x_{2T} - x_{2W}) = 0.6184$
$(x_{3S} - x_{3W})/(x_{3T} - x_{3W}) = 0.6217$
$(r_{31} + r_{32})/(r_{31} - r_{32}) = 1.1108$
$(r_{41} + r_{42})/(r_{41} - r_{42}) = -0.7936$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements.

Figure 1B:
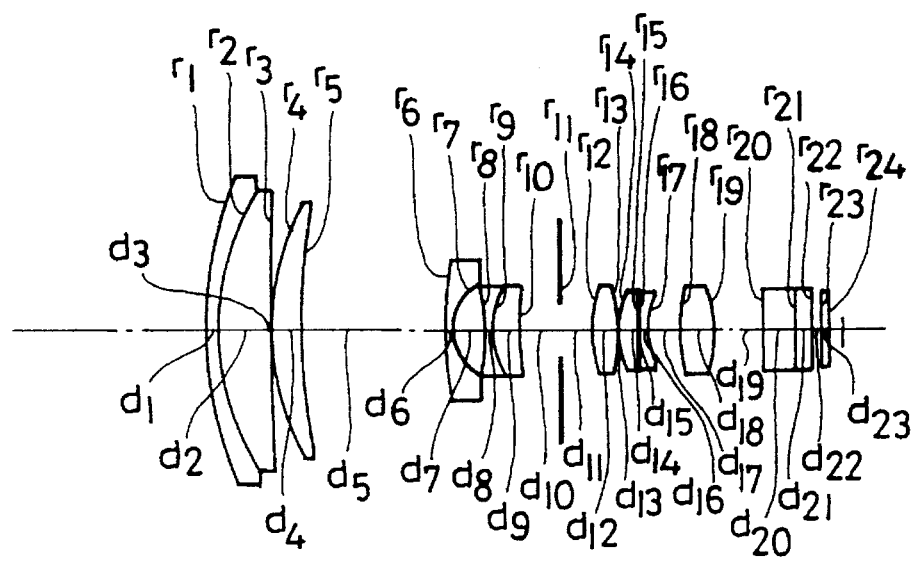
FIG. 1B shows a sectional view illustrating a composition at an intermediate focal length of the first embodiment of the present invention.
Figure 1C:
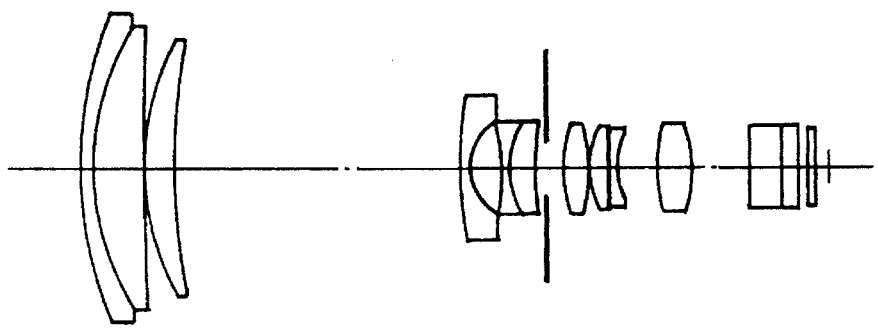
FIG. 1C shows a sectional view illustrating a composition at a tele position of the first embodiment of the present invention.

The first embodiment of the present invention has the composition illustrated in FIGS. 1A, 1B and 1C wherein the reference symbols $F_1(r_{19} \sim r_{20})$, $F_2(r_{20} \sim r_{21})$ and $F_3(r22 \sim r_{23})$ represent optical elements such as an infrared cutoff filter and a low pass filter.

Figure 2A:
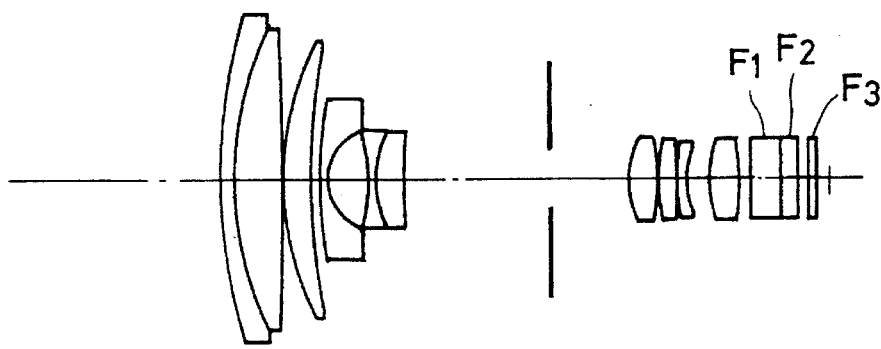
FIG. 2A shows a sectional view illustrating a composition at a wide position of a second embodiment of the vari-focal lens system according to the present invention.
Figure 2B:
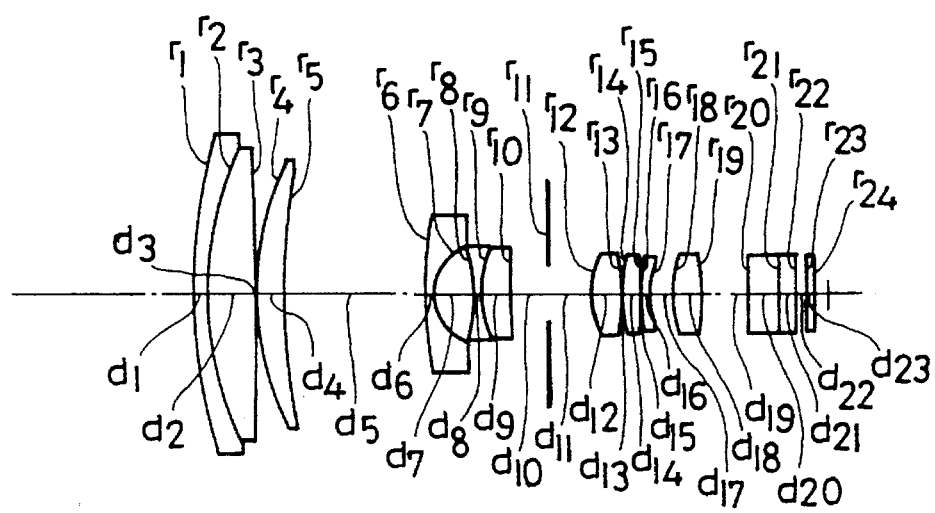
FIG. 2B shows a sectional view illustrating a composition at an intermediate focal length of the second embodiment of the present invention.
Figure 2C:
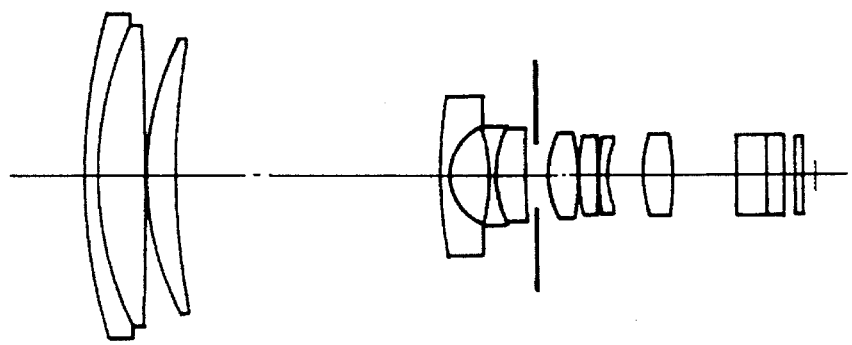
FIG. 2C shows a sectional view illustrating a composition at a tele position of the second embodiment of the present invention.
Figure 3A:
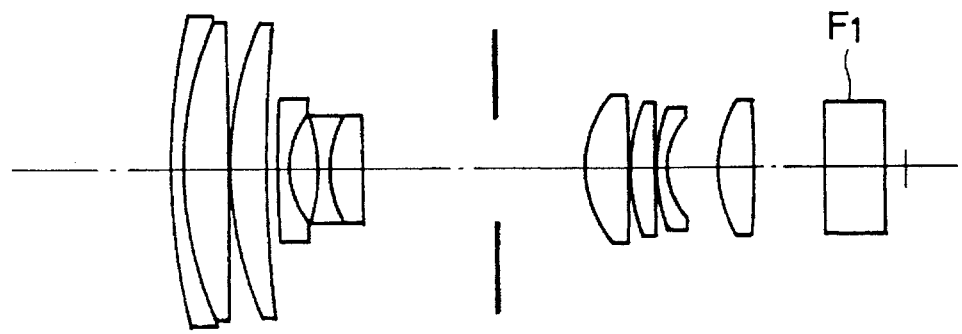
FIG. 3A shows a sectional view illustrating a composition at a wide position of a third embodiment of the vari-focal lens system according to the present invention.
Figure 3B:
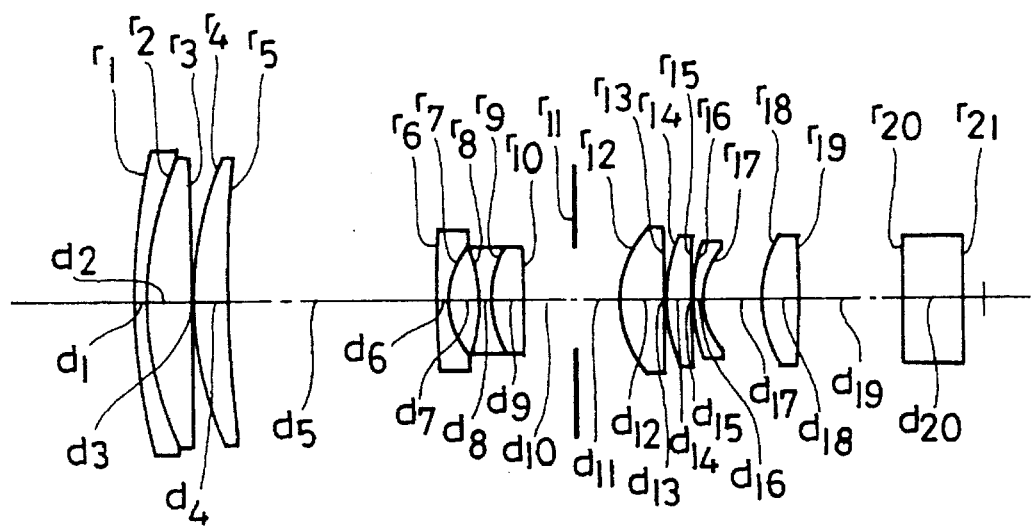
FIG. 3B shows a sectional view illustrating a composition at an intermediate focal length of the third embodiment of the present invention.
Figure 3C:
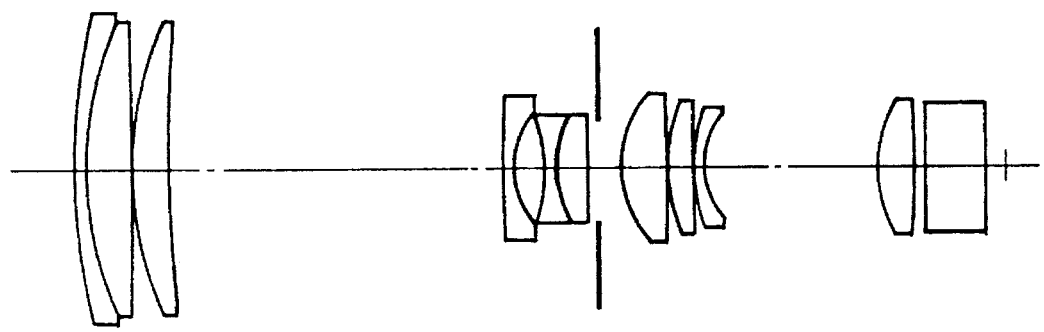
FIG. 3C shows a sectional view illustrating a composition at a tele position of the third embodiment of the present invention.
Figure 4A:
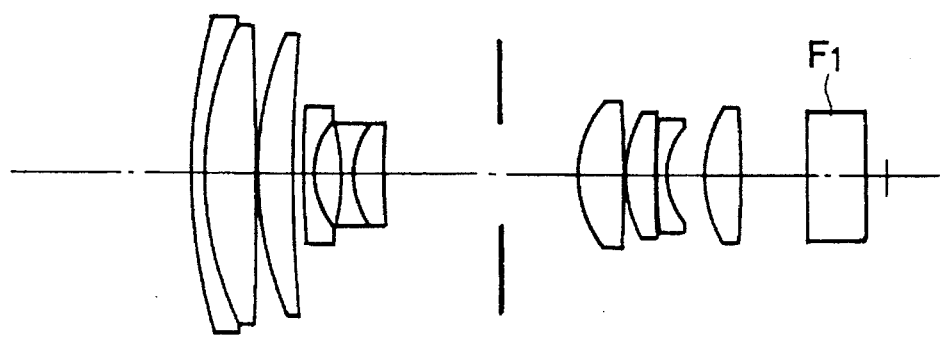
FIG. 4A shows a sectional view illustrating a composition at a wide position of a fourth embodiment of the vari-focal lens system according to the present invention.
Figure 4B:
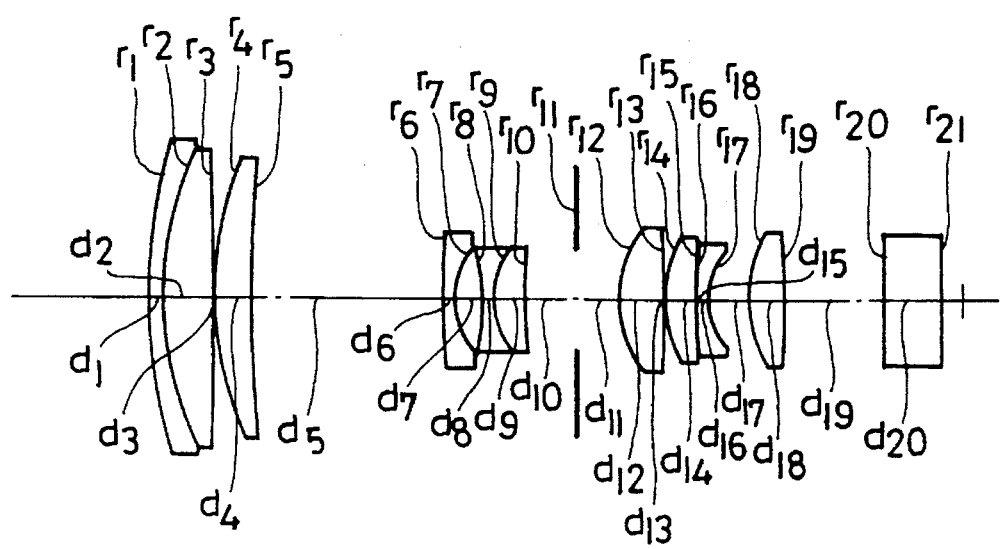
FIG. 4B shows a sectional view illustrating a composition at an intermediate focal length of the fourth embodiment of the present invention.
Figure 4C:
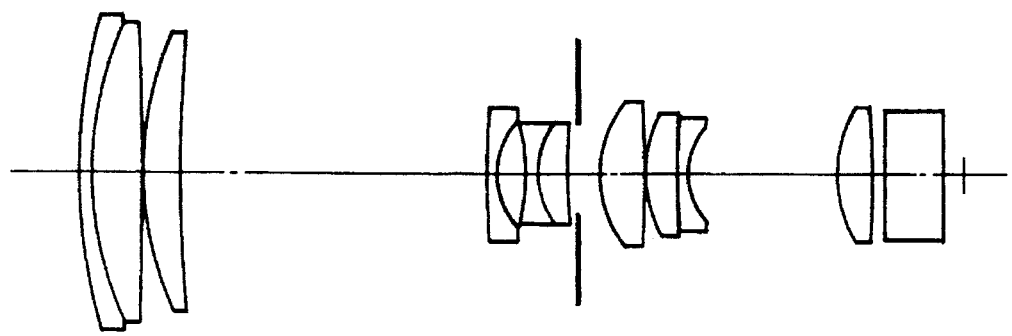
FIG. 4C shows a sectional view illustrating a composition at a tele position of the fourth embodiment of the present invention.

The second embodiment of the present invention has the composition illustrated in FIGS. 2A, 2B and 2C wherein the reference symbols $F_1(r_{20} \sim r_{21})$, $F_2(r_{21} \sim r_{22})$ and $F_3(r_{23} \sim r_{24})$ designate optical elements such as an infrared cutoff filter and a low pass filter.

The third embodiment and the fourth embodiment of the present invention have the compositions illustrated in FIGS. 3A, 3B, 3C and FIGS. 4A, 4B, 4C respectively wherein the reference symbol $F_1(r_{20} \sim r_{21})$ denotes an optical element such as an infrared cutoff filter or a low pass filter.

Further, the first embodiment has the aberration characteristics visualized in FIGS. 5A, 5B, 5C, 5D, 5E, 5F, 6A, 6B, 6C, 6D, 6E, 6F, 7A, 7B, 7C, 7D, 7E and 7F; the second embodiment has the aberration characteristics visualized in FIGS. 8A, 8B, 8C, 8D, 8E, 8F, 9A, 9B, 9C, 9D, 9E, 9F, 10A, 10B, 10C, 10D, 10E and 10F; the third embodiment has the aberration characteristics illustrated in FIGS. 11A, 11B, 11C, 11D, 11E, 11F, 12A, 12B, 12C, 12D, 12E, 12F, 13A, 13B, 13C, 13D, 13E and 13F; and the fourth embodiment has the aberration characteristics illustrated in FIGS. 14A, 14B, 14C, 14D, 14E, 14F, 15A, 15B, 15C, 15D, 15E, 15F, 16A, 16B, 16C, 16D, 16E and 16F respectively.

The aspherical surfaces used in the embodiments of the present invention described above have shapes expressed by the following formula:

$$x = \frac{y^2}{r + r\sqrt{1 - (y/r)^2}} + Ey^4 + Fy^6 + Gy^8 + Hy^{10}$$

wherein an optical axis of the vari-focal lens system is taken as the x axis and a direction perpendicular to the optical axis is taken as the y axis, the reference symbol r represents a paraxial radius of the aspherical surface of interest, and the reference symbols E, F, G and H designate aspherical surface coefficients of the fourth, sixth, eighth and tenth orders respectively.

The vari-focal lens system according to the present invention has a high vari-focal ratio and a wide field angle, and nevertheless can be compact and have a short total length while using a front lens component having a small diameter. When the vari-focal lens system according to the present invention is to have a field angle which is on the order of that of the conventional zoom lens system having a high vari-focal ratio, the vari-focal lens system can be configured extremely compactly by further shortening the diameter of the front lens component and the total length of the vari-focal lens system. Speaking concretely, the vari-focal lens system according to the present invention is compact with a total length of $30 \times f_W \times \tan \omega$ and a diameter of $13 - f_W \times \tan \omega$ on a front lens component when the lens system has a field angle of 75° at the wide position thereof, a vari-focal ratio of 10 and an F number of 1.8. The vari-focal lens system according to the present invention is extremely compact with a total length of $21 \times f_W \times \tan \omega$ and a diameter of $7 \times f_W \times \tan \omega$ on a front lens component when the lens system has a field angle of 54° at the wide position thereof, a vari-focal ratio of 10 and an F number of 1.8.

We claim:

1. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, there being a first airspace between said second and third lens units and a second airspace between said third and fourth lens units, said vari-focal lens system being selectively variable from a first focal length at said wide-angle position to a second focal length at said telephoto position by moving said first lens unit toward said object side, displacing said second lens unit toward said image side, moving said third lens unit so as to make said first airspace narrower and displacing said fourth lens unit so as to make said second airspace wider.

2. A vari-focal lens system comprising, in order from the object side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position;

there being a first airspace between said second and third lens units and a second airspace between said third and fourth lens units;

said vari-focal lens system being selectively variable from a first focal length at said wide-angle position to a second focal length at said telephoto position by moving said first lens unit and said second lens unit along an optical axis in directions which are opposite to each other, moving said second lens unit and said third lens unit along the optical axis in directions which are opposite to each other, and displacing said fourth lens unit so as to make said second airspace wider.

3. A vari-focal lens system according to claim 1 or 2 wherein said third lens unit is moved along a locus which is convex on said object side.

4. A vari-focal lens system according to claim 1 or 2 wherein an aperture stop is disposed between said second lens unit and said third lens unit.

5. A vari-focal lens system according to claim 1 or 2 wherein an aperture stop is disposed between an object side surface and an image side surface of said third lens unit.

6. A vari-focal lens system according to claim 1 or 2 satisfying the following condition (1):

$$0.5 < f_4/f_3 < 1.4 \qquad (1)$$

wherein the reference symbols $f_3$ and $f_4$ represent focal lengths of said third lens unit and said fourth lens unit respectively.

7. A vari-focal lens system according to claim 1 or 2 satisfying the following condition (2):

$$0.81 < D_T/f_W < 6.5 \qquad (2)$$

wherein the reference symbol $f_W$ represents a focal length of said vari-focal lens system as a whole at said wide-angle position when it is focused on an object located an infinite distance, and the reference symbol $D_T$ designates an airspace reserved between said third lens unit and said fourth lens unit at said telephoto position when said vari-focal lens system is focused on an object located at infinite distance.

8. A vari-focal lens system according to claim 1 or 2 satisfying the following condition (3):

$$-0.6 < f_T/f_{AT} < 0.6 \qquad (3)$$

wherein the reference symbol $f_T$ represents a focal length of the vari-focal lens system as a whole at said telephoto position thereof when it is focused on an object located at infinite distance and the reference symbol $f_{AT}$ designates a total focal length of said first lens unit, said second lens unit and said third lens unit at said telephoto position.

9. A vari-focal lens system according to claim 1 or 2 satisfying the following condition (4):

$$-2.0 < (x_{2T}-x_{2W})/(x_{1T}-x_{1W}) < -0.3 \qquad (4)$$

wherein the reference symbol $(x_{1T}-x_{1W})$ represents a distance for which said first lens unit is to be moved and the reference symbol $(x_{2T}-x_{2W})$ designates a distance for which said second lens unit is to be moved.

10. A vari-focal lens system according to claim 1 or 2 satisfying the following condition (5):

$$-1.2 < (x_{3T}-x_{3W})/(x_{2T}-x_{2W}) < -0.3 \qquad (5)$$

wherein the reference symbol $(x_{2T}-x_2W)$ represents a distance for which said second lens unit is to be moved and the reference symbol $(x_{3T}-x_{3W})$ designates a distance for which said third lens unit is to be moved.

11. A vari-focal lens system according to claim 1 or 2 satisfying the following condition (6):

$$0.12 < (x_{1S}-x_{1W})/(x_{1T}-x_{1W}) < 0.7 \qquad (6)$$

wherein the reference symbol $(x_{1T}-x_{1W})$ represents a distance for which said first lens unit is to be moved and the reference symbol $(x_{1S}-x_{1W})$ designates a distance for which said first lens unit is to be moved for setting said vari-focal lens system at an intermediate focal length.

12. A vari-focal lens system according to claim 1 or 2 satisfying the following condition (7):

$$0.45 < (x_{2S}-x_{2W})/(x_{2T}-X_{2W}) < 0.9 \qquad (7)$$

wherein the reference symbol $(x_{2T}-x_{2W})$ represents a distance for which said second lens unit is to be moved and the reference symbol $(x_{2S}-x_{2W})$ designates a distance for which said second lens unit is to be moved for setting said vari-focal lens system at an intermediate focal length.

13. A vari-focal lens system according to claim 1 or 2 satisfying the following condition (8):

$$0.45 < (x_{3S}-x_{3W})/(x_{3T}-x_{3W}) < 0.9 \qquad (8)$$

wherein the reference symbol $(x_{3T}-x_{3W})$ represents a distance for which said third lens unit is to be moved and the reference symbol $(x_{3S}-x_{3W})$ designates a distance for which said third lens unit is to be moved for setting said vari-focal lens system at an intermediate focal length.

14. A vari-focal lens system according to claim 1 or 2 satisfying the following condition (9):

$$0.8 < (r_{31}+r_{32})/(r_{31}-r_{32}) < 3.0 \qquad (9)$$

wherein the reference symbols $r_{31}$ and $r_{32}$ represent radii of curvature on an object side surface and an image side surface respectively of a negative lens element disposed in said third lens unit.

15. A vari-focal lens system according to claim 1 or 2 satisfying the following condition (10):

$$-1.1 < (r_{41}+r_{42})/(r_{41}-r_{42}) < 0.5 \qquad (10)$$

wherein the reference symbols $r_{41}$ and $r_{42}$ represent radii of curvature on an object side surface and an image side surface respectively of a lens element disposed in said fourth lens unit.

16. A vari-focal lens system according to claim 1 or 2, wherein said third lens unit is moved toward an object side.

17. A vari-focal lens system according to claim 1 or 2, wherein said fourth lens unit is moved along an optical axis for focusing said vari-focal lens system on an object located at a finite distance from an object located effectively at an infinite distance.

18. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focusable by moving at least said fourth lens unit, and said third lens unit being movable along a locus which is convex on the object side.

19. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focusable by moving at least said fourth lens unit; and wherein said lens system satisfies the following condition (1):

$$0.5 < f_4/f_3 < 1.4 \qquad (1)$$

wherein the reference symbols $f_3$ and $f_4$ represent focal lengths of said third lens unit and said fourth lens unit, respectively.

20. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focusable by moving at least said fourth lens unit; and wherein said lens system satisfies the following condition (2):

$$0.81 < D_T/f_W < 6.5 \qquad (2)$$

wherein the reference symbol $f_W$ represents a focal length of said vari-focal lens system as a whole at said wide-angle position when it is focused on an object located at an infinite distance, and the reference symbol $D_T$ designates an airspace reserved between said third lens unit and said fourth lens unit at said telephoto position when said vari-focal lens system is focused on an object located at infinite distance.

21. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focusable by moving at least said fourth lens unit; and wherein said lens system satisfies the following condition (3):

$$-0.6 < f_T/f_{AT} < 0.6 \qquad (3)$$

wherein the reference symbol $f_T$ represents a focal length of said vari-focal lens system as a whole at said telephoto position thereof when it is focused on an object located at infinite distance and the reference symbol $f_{AT}$ designates a total focal length of said first lens unit, said second lens unit and said third lens unit at said telephoto position.

22. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focused by moving at least said fourth lens unit; and wherein said lens system satisfies the following condition (4):

$$-2.0 < (x_{2T}-x_{2W})/(x_{1T}-x_{1W}) < -0.3 \quad (4)$$

wherein the reference symbol $(x_{1T}-x_{1W})$ represents a distance for which said first lens unit is to be moved and the reference symbol $(x_{2T}-x_{2W})$ designates a distance for which said second lens unit is to be moved.

23. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focused by moving at least said fourth lens unit; and wherein said lens system satisfies the following condition (5):

$$-1.2 < (X_{3T}-X_{3W})/(X_{2T}-X_{2W}) < -0.3 \quad (5)$$

wherein the reference symbol $(X_{2T}-X_{2W})$ represents a distance for which said second lens unit is to be moved and the reference symbol $(x_{3T}-x_{3W})$ designates a distance for which said third lens unit is to be moved.

24. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focused by moving at least said fourth lens unit; and wherein said lens system satisfies the following condition (6):

$$0.12 < (x_{1S}-x_{1W})/(x_{1T}-x_{1W}) < 0.7 \quad (6)$$

wherein the reference symbol $(X_{1T}-X_{1W})$ represents a distance for which said first lens unit is to be moved and the reference symbol $(x_{1S}-x_{1W})$ designates a distance for which said first lens unit is to be moved for setting said lens system at an intermediate focal length.

25. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focused by moving at least said fourth lens unit; and wherein said lens system satisfies the following condition (7):

$$0.45 < (x_{2S}-x_{2W})/(x_{2T}-X_{T2}) < 0.9 \quad (7)$$

wherein the reference symbol $(X_{2T}-X_{2W})$ represents a distance for which said second lens unit is to be moved and the reference symbol $(x_{2S}-x_{2W})$ designates a distance for which said second lens unit is to be moved for setting said lens system at an intermediate focal length.

26. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focused by moving at least said fourth lens unit; and wherein said lens system satisfies the following condition (8):

$$0.45 < (x_{3S}-x_{3W})/(x_{3T}-x_{3W}) < 0.9 \quad (8)$$

wherein the reference symbol $(x_{3T}-x_{3W})$ represents a distance for which said third lens unit is to be moved and the reference symbol $(x_{3S}-x_{3W})$ designates a distance for which said third lens unit is to be moved for setting said vari-focal lens system at an intermediate focal length.

27. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focused by moving at least said fourth lens unit; and wherein said lens system satisfies the following condition (9):

$$0.8 < (r_{31}+r_{32})/(r_{31}-r_{32}) < 3.0 \qquad (9)$$

wherein reference symbols $r_{31}$ and $r_{32}$ a represent radii of curvature on an object side surface and an image side surface, respectively, of a negative lens element disposed in said third lens unit.

28. A vari-focal lens system comprising, in order from an object to an image side:

a first lens unit having a positive refractive power;

a second lens unit having a negative refractive power;

a third lens unit having a positive refractive power; and a fourth lens unit having a positive refractive power;

wherein said lens system has a wide-angle position and a telephoto position, said lens system being selectively variable from a first focal length at said wide-angle position to a second focal length at said telephoto position by moving said first lens unit toward said object side, displacing said second lens unit toward said image side, displacing said third lens unit to a selectable position along an optical axis toward said object side, and moving said fourth lens unit along said optical axis, wherein said lens system is focused by moving at least said fourth lens unit; and wherein said lens system satisfies the following condition (10):

$$-1.1 < (r_{41}+r_{42})/(r_{41}-r_{42}) < 0.5 \qquad (10)$$

wherein reference symbols $r_{41}$ and $r_{42}$ of curvature on object side surface and image side surface, respectively, of a lens element disposed in said fourth lens unit.

* * * * *